US011161977B2

(12) United States Patent
Takimoto et al.

(10) Patent No.: US 11,161,977 B2
(45) Date of Patent: Nov. 2, 2021

(54) POLYCARBONATE-BASED RESIN COMPOSITION AND MOLDED PRODUCT THEREOF

(71) Applicant: IDEMITSU KOSAN CO., LTD., Tokyo (JP)

(72) Inventors: Masami Takimoto, Sodegaura (JP); Yasuhiro Mogi, Kisarazu (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 20 days.

(21) Appl. No.: 16/079,056

(22) PCT Filed: Mar. 7, 2017

(86) PCT No.: PCT/JP2017/009002

§ 371 (c)(1), (2) Date: Aug. 22, 2018

(87) PCT Pub. No.: WO2017/154903

PCT Pub. Date: Sep. 14, 2017

(65) Prior Publication Data

US 2019/0048184 A1 Feb. 14, 2019

(30) Foreign Application Priority Data

Mar. 9, 2016 (JP) ............................ JP2016-045979

(51) Int. Cl.

| | |
|---|---|
| ***C08L 69/00*** | (2006.01) |
| ***C08G 64/18*** | (2006.01) |
| ***C08G 77/448*** | (2006.01) |
| ***C08K 3/22*** | (2006.01) |
| ***C08K 9/04*** | (2006.01) |
| ***C08K 3/30*** | (2006.01) |
| ***C08K 5/20*** | (2006.01) |
| ***C08K 5/151*** | (2006.01) |
| ***C08K 5/29*** | (2006.01) |

(52) U.S. Cl.

CPC .............. *C08L 69/00* (2013.01); *C08G 64/18* (2013.01); *C08G 77/448* (2013.01); *C08K 3/22* (2013.01); *C08K 3/30* (2013.01); *C08K 5/151* (2013.01); *C08K 5/20* (2013.01); *C08K 5/29* (2013.01); *C08K 9/04* (2013.01); *C08K 2003/2237* (2013.01); *C08K 2003/3036* (2013.01)

(58) Field of Classification Search

CPC ........... C08L 69/00; C08L 9/00; C08G 64/18; C08G 77/448; C08K 3/22; C08K 3/30; C08K 5/151; C08K 5/20; C08K 5/29; C08K 9/04; C08K 2003/2237; C08K 2003/3036

USPC .......................................................... 524/431

See application file for complete search history.

(56) References Cited

U.S. PATENT DOCUMENTS

| | | | | |
|---|---|---|---|---|
| 6,369,141 B1 * | 4/2002 | Ishii | C08K 5/42 | 524/127 |
| 2004/0063824 A1 * | 4/2004 | Takagi | C08K 5/523 | 524/115 |
| 2007/0299174 A1 | 12/2007 | Chen et al. | | |
| 2008/0014376 A1 * | 1/2008 | Horio | C08K 5/0041 | 428/1.6 |
| 2014/0343200 A1 * | 11/2014 | Takimoto | C08K 5/50 | 524/109 |
| 2018/0355113 A1 | 12/2018 | Takimoto et al. | | |

FOREIGN PATENT DOCUMENTS

| | | | |
|---|---|---|---|
| CN | 1890320 A | | 1/2007 |
| CN | 1946806 A | | 4/2007 |
| CN | 101023135 A | | 8/2007 |
| CN | 101585961 A | | 11/2009 |
| CN | 101668799 A | | 3/2010 |
| CN | 102492277 A | | 6/2012 |
| CN | 202881160 U | | 4/2013 |
| CN | 103857745 A | | 6/2014 |
| CN | 104629338 A | | 5/2015 |
| JP | H05-98142 A | | 4/1993 |
| JP | 09316312 A | * | 12/1997 |
| JP | 2007-182501 A | | 7/2007 |
| JP | 2014-028896 A | | 2/2014 |
| KR | 10-2014-0077164 | | 6/2014 |
| TW | 200808900 A | | 2/2008 |
| TW | 201323517 A1 | | 6/2013 |
| WO | WO-2006/030791 A1 | | 3/2006 |

(Continued)

OTHER PUBLICATIONS

WO 2013/051557 A1, machine translation, Google Patents. (Year: 2013).*

WO 2017/154902 A1, machine translation, Google Patents. (Year: 2017).*

JP 09-316312 A, machine translation, EPO Espacenet. (Year: 1997).*

Chinese Office Action dated Jan. 2, 2020 for corresponding Application No. 201780015458.6.

Yao Chao et al., “Surface Modification of Nanosized TiO2 with Silane Coupling Reagent”, Journal of Inorganic Materials, Mar. 31, 2006, pp. 315-321, vol. 21, No. 2, Science Press, China.

(Continued)

*Primary Examiner* — Josephine L Chang

(74) *Attorney, Agent, or Firm* — Foley & Lardner LLP

(57) ABSTRACT

Provided are: a polycarbonate-based resin composition, including a polycarbonate-based resin (A) containing a polycarbonate-polyorganosiloxane copolymer (A1) having a predetermined structure, and 0.1 part by mass or more to 40 parts by mass or less of a white pigment (B) with respect to 100 parts by mass of the polycarbonate-based resin (A), wherein the white pigment (B) has an organic layer on a surface thereof, and a highest peak temperature of an evolved gas analysis curve of the organic layer obtained by evolved gas analysis with a pyrolysis gas chromatograph apparatus and a FID detector is 390° C. or more; and a molded article thereof.

16 Claims, No Drawings

(56) References Cited

FOREIGN PATENT DOCUMENTS

WO WO-2013/051557 A1 4/2013
WO WO-2017154902 A1 * 9/2017 ............... C08K 5/29

OTHER PUBLICATIONS

International Search Report with English language translation and Written Opinion issued in International Application No. PCT/JP2017/009002 dated Apr. 11, 2017.
Office Action dated Jul. 25, 2020 for corresponding Indian Patent Application No. 201847033086.
Office Action dated Aug. 31, 2020 for corresponding Chinese Patent Application No. 201780015458.6.
Office Action dated Sep. 15, 2020 for corresponding Japanese Patent Application No. 2018-504511.
Office Action dated Mar. 23, 2021 for corresponding South Korean Patent Application No. 2018-7025770.
Office Action dated Feb. 19, 2021 for corresponding Chinese Patent Application No. 201780015458.6.
Office Action dated Sep. 13, 2021 issued in a corresponding Korean Patent Application No. 2018-7025770, (10 pages).

* cited by examiner

POLYCARBONATE-BASED RESIN COMPOSITION AND MOLDED PRODUCT THEREOF

RELATED APPLICATIONS

The present application claims priority under 37 U.S.C. § 371 to International Patent Application No. PCT/JP2017/009002, filed Mar. 7, 2017, which claims priority to and the benefit of Japanese Patent Application No. 2016-045979, filed on Mar. 9, 2016. The contents of these applications are hereby incorporated by reference in their entireties.

TECHNICAL FIELD

The present invention relates to a polycarbonate-based resin composition and a molded article thereof, and more specifically, to a polycarbonate-based resin composition that contains a polycarbonate-polyorganosiloxane copolymer and a white pigment, and that is suppressed in occurrence of an appearance failure, such as a silver streak or a black streak, at the time of its molding, and a molded article thereof.

BACKGROUND ART

A polycarbonate resin is excellent in mechanical strength, electrical characteristics, transparency, and the like, and hence has been widely utilized as an engineering plastic in various fields, such as the field of electrical and electronic equipment, and the field of automobiles. And also, the polycarbonate resin is utilized in a casing for a cellular phone, a mobile personal computer, a digital camera, a video camera, an electric tool, or the like. In these applications, impact resistance is important because of a risk of dropping during handling. In addition, a design property (especially a color) is also an important factor.

A desired color can be imparted to a resin material typified by the polycarbonate resin with relative ease by blending the material with a colorant, such as a pigment. Among polycarbonate-based resins, a polycarbonate-polyorganosiloxane copolymer (hereinafter sometimes referred to as "PC-POS copolymer") obtained by copolymerizing a polyorganosiloxane is excellent in impact resistance, and hence has been expected to be applied to the foregoing applications.

The PC-POS copolymer has heat resistance and hydrolysis resistance comparable to those of a general (i.e., POS-free) polycarbonate. Accordingly, the application of the copolymer to a thin-walled molded article or a high-strength member to be used under severe conditions or a severe environment has been advanced by exploiting its features, that is, high impact strength and excellent moldability. However, a resin composition obtained by blending a polycarbonate-based resin containing the PC-POS copolymer as a main component with a white pigment, such as titanium oxide, has a possibility that a black streak-like pattern (black streak) occurs at the time of its molding. Accordingly, in a white-colored polycarbonate resin material, the shortening of the average chain length of a polyorganosiloxane moiety in the PC-POS copolymer, or a reduction in blending amount of the PC-POS copolymer has been needed.

In Patent Document 1, there is a description that when a PC-POS copolymer in which the average chain length of a polyorganosiloxane moiety is short and a PC-POS copolymer in which the average chain length is long are used in combination in a polycarbonate-based resin composition containing a PC-POS copolymer and titanium oxide, a polycarbonate-based resin composition that is suppressed in occurrence of a black streak at the time of its molding and that is excellent in molding appearance and impact resistance is obtained. However, the use of the PC-POS copolymer in which the average chain length of the polyorganosiloxane moiety is short is essential in the resin composition disclosed in Patent Document 1.

In addition, in a white pigment, such as titanium oxide, zinc sulfide, or zinc oxide, used in the white-colored polycarbonate-based resin composition of, for example, a white reflective plate to be attached to a backlight unit of a liquid crystal display (LCD), moisture that cannot be completely removed even when the resin composition is sufficiently dehumidified and dried at from 100° C. to 120° C. serving as a condition for preliminary drying to be performed before typical polycarbonate molding remains. It has been known that when the resin composition containing the moisture is subjected to injection molding, the moisture is transpired by molding heat to cause a silver streak. In order to overcome the issue, there has been known a technology involving suppressing the occurrence of a silver streak through the use of a polycarbonate resin composition containing a combination of a polycarbonate-based polymer and titanium oxide in which a difference between moisture concentrations at 100° C. and 300° C. measured by a Karl-Fischer method of titanium oxide is reduced to 2,700 ppm by mass or less (e.g., Patent Document 2). However, also in Patent Document 2, there is no disclosure of a technology involving suppressing the occurrence of a black streak at the time of molding serving as a phenomenon specific to a polycarbonate-based resin composition containing a PC-POS copolymer and a white pigment.

CITATION LIST

Patent Document

Patent Document 1: WO 2013/051557 A1
Patent Document 2: WO 2006/030791 A1

SUMMARY OF INVENTION

Technical Problem

An object of the present invention is to provide a polycarbonate-based resin composition that contains a PC-POS copolymer and a white pigment, and that is suppressed in occurrence of an appearance failure, such as a silver streak or a black streak, at the time of its molding, and a molded article thereof.

Solution to Problem

The inventors of the present invention have found that the object is achieved by providing a polycarbonate-based resin composition comprising a polycarbonate-based resin containing a predetermined PC-POS copolymer and a predetermined white pigment.

That is, the present invention relates to the following items 1 to 11.

1. A polycarbonate-based resin composition, comprising a polycarbonate-based resin (A) containing a polycarbonate-polyorganosiloxane copolymer (A1) containing a polycarbonate block comprising a repeating unit represented by general formula (I) and a polyorganosiloxane block containing a repeating unit represented by general formula (II), and 0.1 part by mass or more to 40 parts by mass or less of a white pigment (B) with respect to 100 parts by mass of the polycarbonate-based resin (A), wherein the white pigment (B) has an organic layer on a surface thereof, and a highest peak temperature of an evolved gas analysis curve of the organic layer obtained by evolved gas analysis with a pyrolysis gas chromatograph apparatus and a FID detector is 390° C. or more:

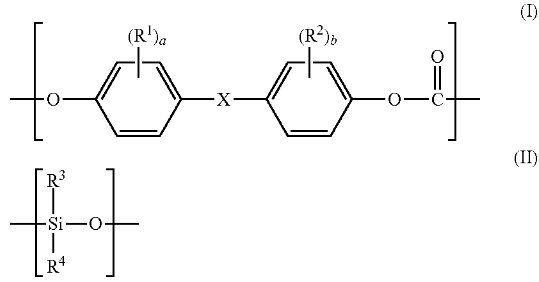

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —$SO_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and a and b each independently represent an integer of from 0 to 4.

2. The resin composition according to Item 1, further comprising 0.02 part by mass or more to 5.0 parts by mass or less of a hydrolysis resistant agent (C) with respect to 100 parts by mass of the polycarbonate-based resin (A).

3. The resin composition according to Item 1 or 2, wherein a content of a polyorganosiloxane in the polycarbonate-based resin (A) is 0.1 mass % or more to 25 mass % or less.

4. The resin composition according to any one of Items 1 to 3, wherein the polycarbonate-based resin (A) has a viscosity-average molecular weight of 12,000 or more to 50,000 or less.

5. The resin composition according to any one of Items 1 to 4, wherein a content of the polyorganosiloxane block in the polycarbonate-polyorganosiloxane copolymer (A1) is 1.0 mass % or more to 25 mass % or less.

6. The resin composition according to any one of Items 1 to 5, wherein the white pigment (B) comprises at least one selected from the group consisting of a titanium oxide pigment, a zinc sulfide pigment, a zinc oxide pigment, and a barium sulfate pigment.

7. The resin composition according to Item 6, wherein the white pigment (B) comprises the titanium oxide pigment.

8. The resin composition according to Item 7, wherein the titanium oxide pigment has, on a surface of each of titanium oxide particles, an inorganic oxide layer comprising one or more inorganic oxides selected from the group consisting of silica, zirconia, and alumina, and wherein the titanium oxide pigment has the organic layer on a surface of the inorganic oxide layer.

9. The resin composition according to any one of Items 1 to 8, wherein a value obtained by subtracting a moisture concentration of the white pigment (B) measured at from 0° C. to 120° C. by a Karl-Fischer method from a moisture concentration thereof measured at from 0° C. to 300° C. by the Karl-Fischer method is 8,000 ppm by mass or less.

10. The resin composition according to any one of Items 2 to 9, wherein the hydrolysis resistant agent (C) comprises one or more selected from the group consisting of an amide compound (C1), an imide compound (C2), and an epoxy compound (C3).

11. A molded article, comprising the resin composition of any one of Items 1 to 10.

Advantageous Effects of Invention

The polycarbonate-based resin composition of the present invention can provide a white molded article having satisfactory molding appearance because the resin composition is suppressed in occurrence of a black streak at the time of its molding despite containing the PC-POS copolymer and the white pigment. The molded article can be suitably used in parts for electrical and electronic equipment or casings for the equipment, parts for the interior and exterior of lighting equipment, parts for the interior and exterior of a vehicle, food trays, and eating utensils. In particular, the molded article is suitable as a material for a casing for a cellular phone, a mobile personal computer, a digital camera, a video camera, an electric tool, or the like.

DESCRIPTION OF EMBODIMENTS

A polycarbonate-based resin composition of the present invention is described in detail below. In this description, a specification considered to be preferred can be arbitrarily adopted, and a combination of preferred specifications can be said to be more preferred. In addition, the term "XX to YY" as used herein means "XX or more to YY or less."

[Polycarbonate-Based Resin Composition]

A polycarbonate-based resin composition of the present invention comprises a polycarbonate-based resin (A) containing a polycarbonate-polyorganosiloxane copolymer (A1) containing a polycarbonate block comprising a repeating unit represented by general formula (I) and a polyorganosiloxane block containing a repeating unit represented by general formula (II), and 0.1 part by mass or more to 40 parts by mass or less of a white pigment (B) with respect to 100 parts by mass of the polycarbonate-based resin (A), wherein the white pigment (B) has an organic layer on a surface thereof, and a highest peak temperature of an evolved gas analysis curve of the organic layer obtained by evolved gas analysis with a pyrolysis gas chromatograph apparatus and a FID detector is 390° C. or more:

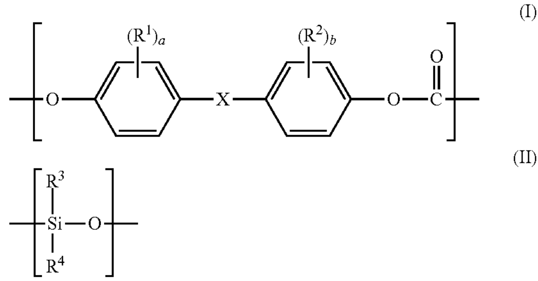

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —$SO_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and a and b each independently represent an integer of from 0 to 4.

<Polycarbonate-Based Resin (A)>

The polycarbonate-based resin composition of the present invention comprises the polycarbonate-based resin (A) containing the predetermined polycarbonate-polyorganosiloxane copolymer (A1).

(Polycarbonate-Polyorganosiloxane Copolymer (A1))

The polycarbonate-polyorganosiloxane copolymer (A1) contains a polycarbonate block comprising a repeating unit represented by the following general formula (I) and a polyorganosiloxane block containing a repeating unit represented by the following general formula (II).

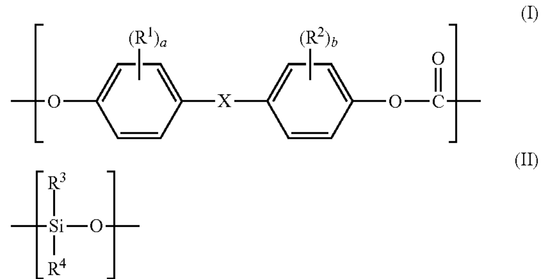

In the general formula (I), $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —$SO_2$—, —O—, or —CO—, and a and b each independently represent an integer of from 0 to 4.

In the general formula (II), $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and a and b each independently represent an integer of from 0 to 4.

Examples of the halogen atom that $R^1$ and $R^2$ in the general formula (I) each independently represent include a fluorine atom, a chlorine atom, a bromine atom, and an iodine atom.

Examples of the alkyl group that $R^1$ and $R^2$ each independently represent include a methyl group, an ethyl group, a n-propyl group, an isopropyl group, various butyl groups ("various" means that a linear group and any branched group are included, and the same applies hereinafter), various pentyl groups, and various hexyl groups. An example of the alkoxy group that $R^1$ and $R^2$ each independently represent is an alkoxy group whose alkyl group moiety is the alkyl group described above.

The alkylene group represented by X is, for example, a methylene group, an ethylene group, a trimethylene group, a tetramethylene group, or a hexamethylene group, and is preferably an alkylene group having 1 to 5 carbon atoms. Examples of the alkylidene group represented by X include an ethylidene group and an isopropylidene group. The cycloalkylene group represented by X is, for example, a cyclopentanediyl group, a cyclohexanediyl group, or a cyclooctanediyl group, and is preferably a cycloalkylene group having 5 to 10 carbon atoms. The cycloalkylidene group represented by X is, for example, a cyclohexylidene group, a 3,5,5-trimethylcyclohexylidene group, or a 2-adamantylidene group, and is preferably a cycloalkylidene group having 5 to 10 carbon atoms, more preferably a cycloalkylidene group having 5 to 8 carbon atoms. As an aryl moiety of the arylalkylene group represented by X, there are given, for example, aryl groups each having 6 to 14 ring-forming carbons, such as a phenyl group, a naphthyl group, a biphenyl group, and an anthryl group. As an aryl moiety of the arylalkylidene group represented by X, there are given, for example, aryl groups each having 6 to 14 ring-forming carbons, such as a phenyl group, a naphthyl group, a biphenyl group, and an anthryl group.

a and b each independently represent an integer of from 0 to 4, preferably from 0 to 2, more preferably 0 or 1.

Among them, the following is suitable: a repeating unit in which a and b each represent 0, and X represents a single bond or an alkylene group having 1 to 8 carbon atoms, or a repeating unit in which a and b each represent 0, and X represents an alkylidene group, particularly an isopropylidene group.

Examples of the halogen atom that $R^3$ and $R^4$ in the general formula (II) each independently represent include a fluorine atom, a chlorine atom, a bromine atom, and an iodine atom. Examples of the alkyl group that $R^3$ and $R^4$ each independently represent include a methyl group, an ethyl group, a n-propyl group, an isopropyl group, various butyl groups, various pentyl groups, and various hexyl groups. An example of the alkoxy group that $R^3$ and $R^4$ each independently represent is an alkoxy group whose alkyl group moiety is the alkyl group described above. Examples of the aryl group that $R^3$ and $R^4$ each independently represent include a phenyl group and a naphthyl group.

$R^3$ and $R^4$ each preferably represent a hydrogen atom, an alkyl group having 1 to 6 carbon atoms, an alkoxy group having 1 to 6 carbon atoms, or an aryl group having 6 to 12 carbon atoms, and each more preferably represent a methyl group.

The polyorganosiloxane block containing a repeating unit represented by the general formula (II) preferably contains a unit represented by any one of the following general formulae (II-I) to (II-III):

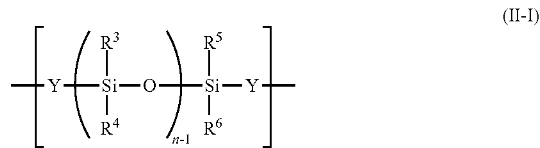

-continued (II-II)

(II-III)

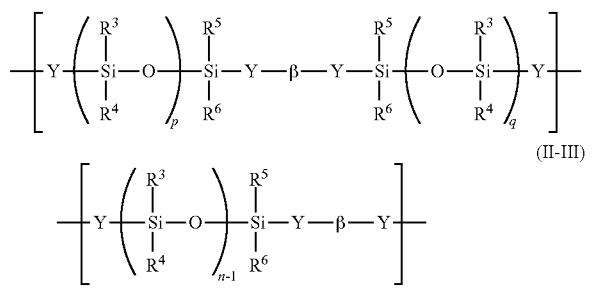

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, $R^4$, $R^5$ or $R^6$ may be identical to or different from each other, Y represents —$R^7$O—, —$R^7$COO—, —$R^7$NH—, —$R^7NR^8$—, —COO—, —S—, —$R^7$COO—$R^9$—O—, or —$R^7$O—$R^{10}$—O—, and a plurality of Y may be identical to or different from each other, the $R^7$ represents a single bond, a linear, branched, or cyclic alkylene group, a divalent organic residue containing an aliphatic group and an aromatic group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, β represents a divalent group derived from a diisocyanate compound, or a divalent group derived from a dicarboxylic acid or a halide of a dicarboxylic acid, n represents the average chain length of a polyorganosiloxane, p and q each represent an integer of 1 or more, and the sum of p and q is n−2.

Examples of the halogen atom that $R^3$ to $R^6$ each independently represent include a fluorine atom, a chlorine atom, a bromine atom, and an iodine atom. Examples of the alkyl group that $R^3$ to $R^6$ each independently represent include a methyl group, an ethyl group, a n-propyl group, an isopropyl group, various butyl groups, various pentyl groups, and various hexyl groups. An example of the alkoxy group that $R^3$ to $R^6$ each independently represent is an alkoxy group whose alkyl group moiety is the alkyl group described above. Examples of the aryl group that $R^3$ to $R^6$ each independently represent include a phenyl group and a naphthyl group.

$R^3$ to $R^6$ each preferably represent a hydrogen atom, an alkyl group having 1 to 6 carbon atoms, an alkoxy group having 1 to 6 carbon atoms, or an aryl group having 6 to 12 carbon atoms.

It is preferred that $R^3$ to $R^6$ in the general formula (II-I), the general formula (II-II), and/or the general formula (II-III) each represent a methyl group. The linear or branched alkylene group represented by $R^7$ in —$R^7$O—, —$R^7$COO—, —$R^7$NH—, —$R^7NR^8$—, —COO—, —S—, —$R^7$COO—$R^9$—O—, or —$R^7$O—$R^{10}$—O— represented by Y is, for example, an alkylene group having 1 to 8, preferably 1 to 5 carbon atoms, and the cyclic alkylene group represented by $R^7$ is, for example, a cycloalkylene group having 5 to 15, preferably 5 to 10 carbon atoms.

The divalent organic residue containing an aliphatic group and an aromatic group represented by $R^7$ may further have a substituent, such as an alkoxy group or an alkyl group, on its aromatic ring, and a specific structure thereof may be, for example, a structure represented by the following general formula (x) or (xi), provided that in the case of the following general formula, the alkylene group is bonded to Si:

(x)

(xi)

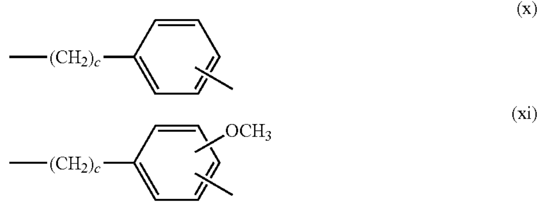

wherein c represents a positive integer and typically represents an integer of from 1 to 6.

The diarylene group represented by any one of $R^7$, $R^9$, and $R^{10}$ is a group in which two arylene groups are linked to each other directly or through a divalent organic group, and is specifically a group having a structure represented by —$Ar^1$—W—$Ar^2$—. Here, $Ar^1$ and $Ar^2$ each represent an arylene group, and W represents a single bond or a divalent organic group. Examples of the divalent organic group represented by W include an isopropylidene group, a methylene group, a dimethylene group and a trimethylene group.

Examples of the arylene group represented by any one of $R^7$, $Ar^1$, and $Ar^2$ include arylene groups each having 6 to 14 ring-forming carbon atoms, such as a phenylene group, a naphthylene group, a biphenylene group, and an anthrylene group. Those arylene groups may each have an arbitrary substituent, such as an alkoxy group or an alkyl group.

The alkyl group represented by $R^8$ is a linear or branched group having 1 to 8, preferably 1 to 5 carbon atoms. The alkenyl group represented by $R^8$ is, for example, a linear or branched group having 2 to 8, preferably 2 to 5 carbon atoms. The aryl group represented by $R^8$ is, for example, a phenyl group or a naphthyl group. The aralkyl group represented by $R^8$ is, for example, a phenylmethyl group or a phenylethyl group.

The linear, branched, or cyclic alkylene group represented by $R^{10}$ is the same as that represented by $R^7$.

Y preferably represents —$R^7$O—, and $R^7$ represents a divalent organic residue containing an aliphatic group and an aromatic group. In particular, $R^7$ preferably represents a divalent residue of a phenol-based compound having an alkyl group, and more preferably represents, for example, a divalent organic residue derived from allylphenol or a divalent organic residue derived from eugenol. Specifically, $R^7$ preferably represents a structure represented by the general formula (x) or (xi).

With regard to p and q in the formula (II-II), it is preferred that p=q, i.e., p=(n−2)/2 and q=(n−2)/2.

β represents a divalent group derived from a diisocyanate compound, or a divalent group derived from a dicarboxylic acid or a halide of a dicarboxylic acid, and examples thereof include divalent groups represented by the following general formulae (xiii) to (xvii).

(xiii)

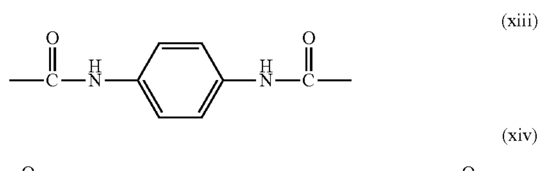

(xiv)

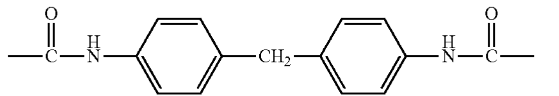

-continued (xv)

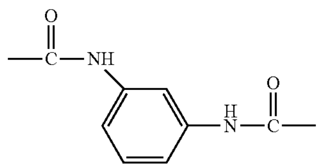

(xvi)

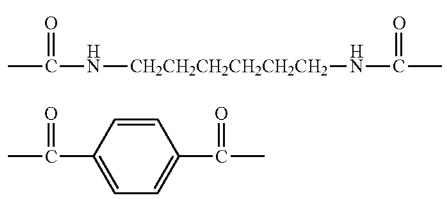

(xvii)

The average chain length n of the polyorganosiloxane block in the PC-POS copolymer (A1) to be used in the present invention is preferably 50 or more. That is, n in each of the formulae (II-I) and (II-III) is preferably 50 or more, and in the case of the formula (II-ID, a number obtained by adding 2 to the sum of p and q preferably falls within the range. The average chain length is calculated by nuclear magnetic resonance (NMR) measurement.

When the average chain length n is 50 or more, the low-temperature impact resistance of a molded article of the resin composition is satisfactory. The average chain length n is more preferably 60 or more to 500 or less, still more preferably 70 or more to 300 or less, still further more preferably 80 or more to 150 or less, most preferably 85 or more to 120 or less. The average chain length is calculated by nuclear magnetic resonance (NMR) measurement. The average chain length n is preferably 500 or less because when the average chain length is more than 500, it becomes difficult to handle the polyorganosiloxane at the time of the production of the PC-POS copolymer (A1), and the difficulty results in poor economical efficiency.

The content of the polyorganosiloxane block in the PC-POS copolymer (A1) to be used in the present invention is preferably 1.0 mass % or more to 25 mass % or less, more preferably 1.0 mass % or more to 20 mass % or less, still more preferably 2.0 mass % or more to 10 mass % or less, still further more preferably 4.0 mass % or more to 8.0 mass % or less from the viewpoint that more satisfactory impact resistance is obtained.

The viscosity-average molecular weight (Mv) of the PC-POS copolymer (A1) to be used in the present invention, which can be appropriately adjusted with, for example, a molecular weight modifier so as to be a molecular weight intended for an application or a product in which the copolymer is used, is preferably 12,000 or more to 50,000 or less, more preferably 15,000 or more to 30,000 or less, still more preferably 16,000 or more to 25,000 or less, still further more preferably 16,000 or more to 22,000 or less. When the viscosity-average molecular weight is 12,000 or more, a molded article having a sufficient impact strength can be obtained. When the viscosity-average molecular weight is 50,000 or less, the fluidity of the copolymer is not excessively low and hence its moldability is satisfactory. Accordingly, the injection molding or extrusion molding of the composition can be performed at such a temperature that its heat deterioration does not occur.

The viscosity-average molecular weight (Mv) is a value calculated from the following Schnell's equation by measuring the limiting viscosity [η] of a methylene chloride solution at 20° C. (concentration: g/L).

$$[\eta]=1.23\times10^{-5}\times Mv^{0.83}$$

The PC-POS copolymers (A1) may be used alone or in combination thereof. A case in which two or more of the PC-POS copolymers (A1) are used is, for example, a case in which two or more of PC-POS copolymers different from each other in average chain length of the polyorganosiloxane block, content of the polyorganosiloxane block, or viscosity-average molecular weight are combined.

(Other Polycarbonate-Based Resin (A2))

The polycarbonate-based resin (A) to be used in the present invention may further contain a polycarbonate-based resin (A2) except the PC-POS copolymers (A1). The polycarbonate-based resin (A2) is preferably an aromatic polycarbonate-based resin, more preferably an aromatic polycarbonate-based resin consisting of a repeating unit represented by the following general formula (III):

(III)

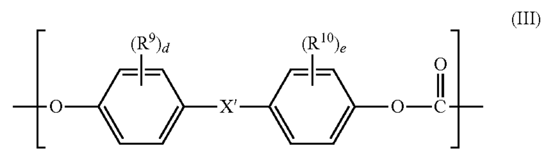

wherein $R^9$ and $R^{10}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —$SO_2$—, —O—, or —CO—, and d and e each independently represent an integer of from 0 to 4.

Specific examples of $R^9$ and $R^{10}$ include the same examples as those of the $R^1$ and the $R^2$, and preferred examples thereof are also the same as those of the $R^1$ and the $R^2$. $R^9$ and $R^{10}$ each more preferably represent an alkyl group having 1 to 6 carbon atoms or an alkoxy group having 1 to 6 carbon atoms. Specific examples of X' include the same examples as those of the X, and preferred examples thereof are also the same as those of the X. d and e each independently represent preferably from 0 to 2, more preferably 0 or 1.

The content of the PC-POS copolymer (A1) in the polycarbonate-based resin (A) is preferably 10 mass % or more to 100 mass % or less, more preferably 50 mass % or more to 100 mass % or less, still more preferably 70 mass % or more to 100 mass % or less from the viewpoint that more satisfactory impact resistance is obtained.

The content of the polyorganosiloxane in the polycarbonate-based resin (A) is preferably 0.1 mass % or more to 25 mass % or less, more preferably 0.5 mass % or more to 20 mass % or less, still more preferably 1.0 mass % or more to 10 mass % or less from the viewpoint that more satisfactory impact resistance is obtained.

The viscosity-average molecular weight (Mv) of the polycarbonate-based resin (A), which can be appropriately adjusted so as to be a molecular weight intended for an application or a product in which the resin is used, is preferably 12,000 or more to 50,000 or less, more preferably 15,000 or more to 30,000 or less, still more preferably 16,000 or more to 25,000 or less, still further more preferably 16,000 or more to 22,000 or less. When the viscosity-average molecular weight is 12,000 or more, a sufficient strength of a molded article of the resin composition can be obtained. When the viscosity-average molecular weight is 50,000 or less, the fluidity of the resin composition is not excessively low and hence its moldability is satisfactory. Accordingly, the injection molding or extrusion molding of the resin composition can be performed at such a temperature that its heat deterioration does not occur.

The viscosity-average molecular weight (Mv) can be determined by the same method as that described above.

(Method of Producing PC-POS Copolymer (A1))

The PC-POS copolymer (A1) in the polycarbonate-based resin composition of the present invention can be produced by a known production method, such as an interfacial polymerization method (phosgene method), a pyridine method, or an ester exchange method. Particularly in the case of the interfacial polymerization method, the step of separating an organic phase containing the PC-POS copolymer and an aqueous phase containing an unreacted substance, a catalyst residue, or the like becomes easy, and the separation of the organic phase containing the PC-POS copolymer and the aqueous phase in each washing step based on alkali washing, acid washing, or pure water washing becomes easy. Accordingly, the PC-POS copolymer is efficiently obtained. With regard to the method of producing the PC-POS copolymer, reference can be made to a method described in, for example, JP 2005-60599 A.

Specifically, the copolymer can be produced by: dissolving an aromatic polycarbonate oligomer produced in advance to be described later and the polyorganosiloxane in a water-insoluble organic solvent (such as methylene chloride); adding an alkaline compound aqueous solution (such as aqueous sodium hydroxide) of a dihydric phenol-based compound (such as bisphenol A) to the solution; and subjecting the mixture to an interfacial polycondensation reaction through the use of a tertiary amine (such as triethylamine) or a quaternary ammonium salt (such as trimethylbenzylammonium chloride) as a polymerization catalyst in the presence of a terminal stopper (a monohydric phenol, such as p-t-butylphenol). In addition, the PC-POS copolymer (A1) can be produced by copolymerizing the polyorganosiloxane, a dihydric phenol, and phosgene, a carbonate ester, or a chloroformate.

When the PC-POS copolymer (A1) is produced by, for example, causing the polycarbonate oligomer and a polyorganosiloxane raw material to react with each other in an organic solvent, and then causing the resultant to react with the dihydric phenol, the solid content mass (g/L) of the polycarbonate oligomer in 1 L of a mixed solution of the organic solvent and the polycarbonate oligomer falls within the range of preferably from 80 g/L to 200 g/L, more preferably from 90 g/L to 180 g/L, still more preferably from 100 g/L to 170 g/L.

A polyorganosiloxane represented by the following general formula (i), the following general formula (ii), and/or the following general formula (iii) can be used as the polyorganosiloxane serving as a raw material for the PC-POS copolymer (A1):

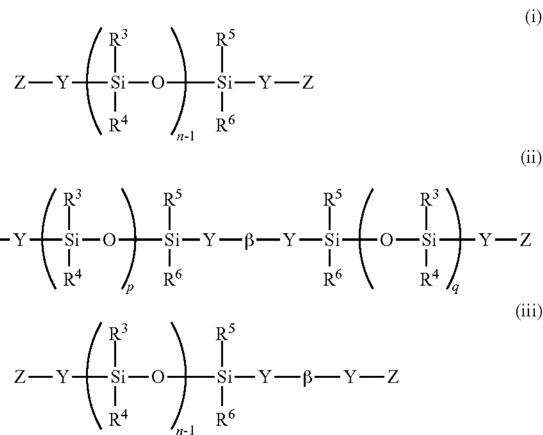

wherein $R^3$ to $R^6$, Y, β, n−1, p, and q are as described above, and specific examples thereof and preferred examples thereof are also the same as those described above.

Z represents a hydrogen atom or a halogen atom, and a plurality of Z may be identical to or different from each other.

Examples of the polyorganosiloxane represented by the general formula (i) include compounds represented by the following general formulae (i-i) to (i-xi):

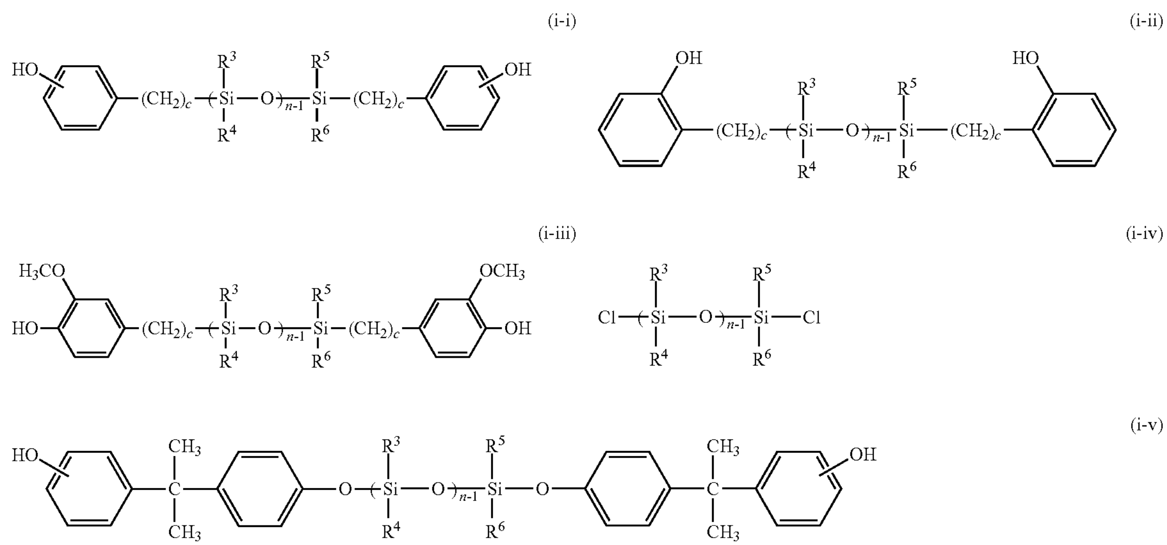

-continued

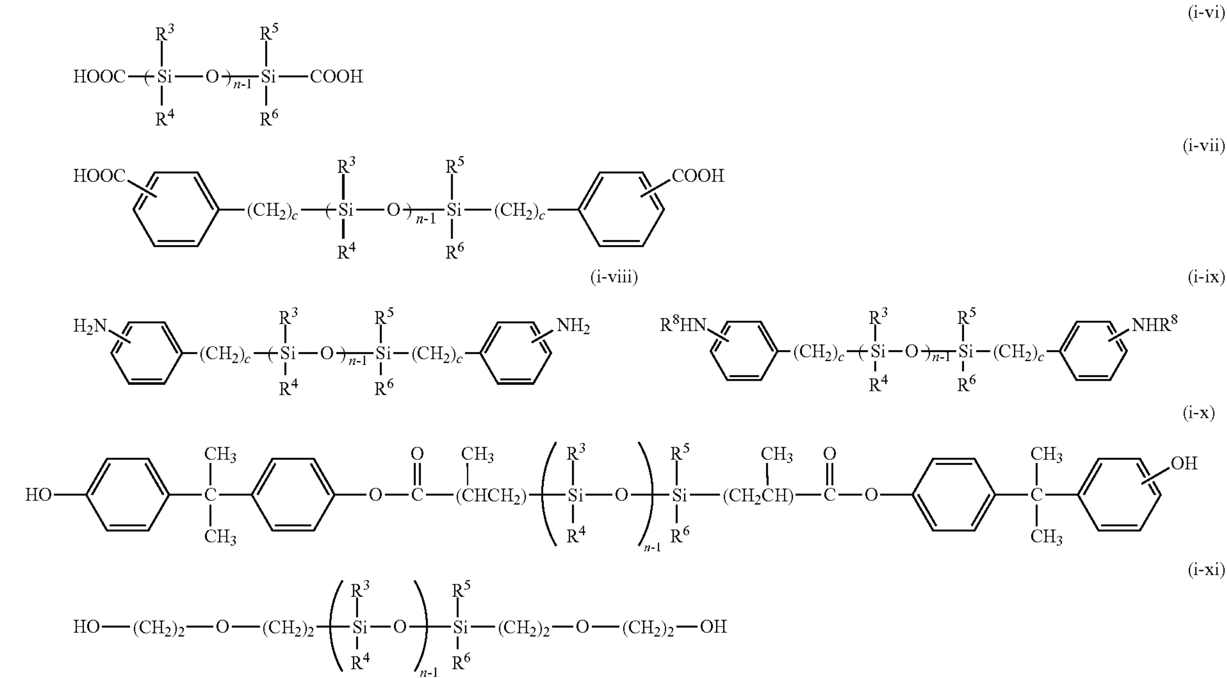

In the formulae (i-i) to (i-xi), $R^3$ to $R^6$, n, and $R^8$ are as defined above, and preferred examples thereof are also the same as those described above, and c represents a positive integer and typically represents an integer of from 1 to 6.

Among them, a phenol-modified polyorganosiloxane represented by the general formula (i-i) is preferred from the viewpoint of its ease of polymerization. An α,ω-bis[3-(o-hydroxyphenyl)propyl]polydimethylsiloxane, which is one compound represented by the general formula (i-ii), or an α,ω-bis [3-(4-hydroxy-3-methoxyphenyl)propyl]polydimethylsiloxane, which is one compound represented by the general formula (i-iii), is preferred from the viewpoint of its ease of availability.

In addition to the foregoing, a compound represented by the following general formula (xii) may be used as a polyorganosiloxane raw material;

(xii)

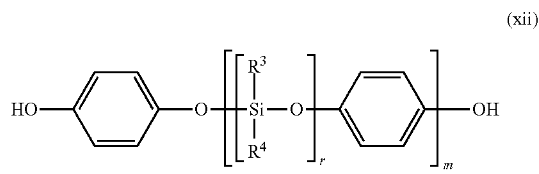

wherein $R^3$ and $R^4$ are identical to those described above. The average chain length of the polyorganosiloxane block represented by the general formula (xii) is (r×m), and the range of the (r×m) is the same as that of the n.

When the compound represented by the general formula (xii) is used as a polyorganosiloxane raw material, the polyorganosiloxane block (II) preferably has a unit represented by the following general formula (II-IV):

(II-IV)

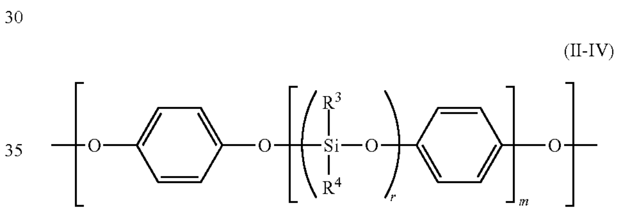

wherein $R^3$, $R^4$, r, and m are as described above.

A method of producing the polyorganosiloxane is not particularly limited. According to, for example, a method described in JP 811-217390 A, a crude polyorganosiloxane can be obtained by; causing cyclotrisiloxane and disiloxane to react with each other in the presence of an acid catalyst to synthesize α,ω-dihydrogen organopentasiloxane; and then subjecting a phenolic compound (such as 2-allylphenol, 4-allylphenol, eugenol, or 2-propenylphenol) or the like to an addition reaction with the α,ω-dihydrogen organopentasiloxane in the presence of a catalyst for a hydrosilylation reaction. In addition, according to a method described in JP 2662310 B2, the crude polyorganosiloxane can be obtained by; causing octamethylcyclotetrasiloxane and tetramethydisiloxane to react with each other in the presence of sulfuric acid (acid catalyst); and subjecting a phenolic compound or the like to an addition reaction with the resultant α,ω-dihydrogen organopolysiloxane in the presence of the catalyst for a hydrosilylation reaction in the same manner as described above. The average chain length n of the α,ω-dihydrogen organopolysiloxane can be appropriately adjusted depending on a polymerization condition therefor before its use, or a commercially available α,ω-dihydrogen organopolysiloxane may be used.

Examples of the catalyst for a hydrosilylation reaction include transition metal-based catalysts. Among them, a platinum-based catalyst is preferably used in terms of a reaction rate and selectivity. Specific examples of the platinum-based catalyst include chloroplatinic acid, a solution of chloroplatinic acid in an alcohol, an olefin complex of platinum, a complex of platinum and a vinyl group-containing siloxane, a platinum-supported silica, and a platinum-supported activated carbon.

An adsorbent is preferably caused to adsorb and remove a transition metal derived from a transition metal-based catalyst used as the catalyst for a hydrosilylation reaction in the crude polyorganosiloxane by bringing the crude polyorganosiloxane into contact with the adsorbent.

An adsorbent having an average pore diameter of, for example, 1,000 Å or less can be used as the adsorbent. When the average pore diameter is 1,000 Å or less, the transition metal in the crude polyorganosiloxane can be efficiently removed. From such viewpoint, the average pore diameter of the adsorbent is preferably 500 Å or less, more preferably 200 Å or less, still more preferably 150 Å or less, yet still more preferably 100 Å or less. In addition, from the same viewpoint, the adsorbent is preferably a porous adsorbent.

The adsorbent is not particularly limited as long as the adsorbent has the above-mentioned average pore diameter. For example, there may be used activated clay, acidic clay, activated carbon, synthetic zeolite, natural zeolite, activated alumina, silica, a silica-magnesia-based adsorbent, diatomaceous earth, and cellulose. Among them, preferred is at least one selected from the group consisting of activated clay, acidic clay, activated carbon, synthetic zeolite, natural zeolite, activated alumina, silica, and a silica-magnesia-based adsorbent.

After the adsorbent has been caused to adsorb the transition metal in the crude polyorganosiloxane, the adsorbent can be separated from the polyorganosiloxane by arbitrary separating means. Examples of the means for separating the adsorbent from the polyorganosiloxane include a filter and centrifugation. When the filter is used, a filter such as a membrane filter, a sintered metal filter, or a glass fiber filter can be used. Among them, the membrane filter is particularly preferably used.

The average particle diameter of the adsorbent is typically from 1 μm to 4 mm, preferably from 1 μm to 100 μm from the viewpoint of separating the adsorbent from the polyorganosiloxane after the adsorption of the transition metal.

When the adsorbent is used, its usage amount is not particularly limited. A porous adsorbent can be used in an amount in the range of preferably from 1 part by mass to 30 parts by mass, more preferably from 2 parts by mass to 20 parts by mass with respect to 100 parts by mass of the crude polyorganosiloxane.

When the crude polyorganosiloxane to be treated has so high a molecular weight that the crude polyorganosiloxane is not in a liquid state, the polyorganosiloxane may be heated to such a temperature as to be in a liquid state upon performance of the adsorption with the adsorbent and the separation of the adsorbent. Alternatively, the adsorption and the separation may be performed under a state in which the polyorganosiloxane is dissolved in a solvent, such as methylene chloride or hexane.

The polycarbonate oligomer can be produced through a reaction of a dihydric phenol and a carbonate precursor, such as phosgene or triphosgene, in an organic solvent, such as methylene chloride, chlorobenzene, or chloroform. When the polycarbonate oligomer is produced by using an ester exchange method, the oligomer can also be produced through a reaction of a dihydric phenol and a carbonate precursor, such as diphenyl carbonate.

A dihydric phenol represented by the following general formula (iv) is preferably used as the dihydric phenol:

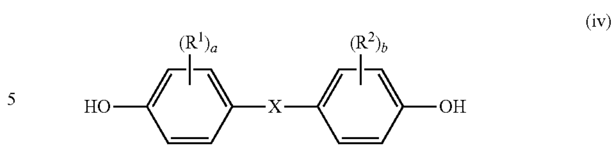

(iv)

wherein $R^1$, $R^2$, a, b, and X are as described above.

Examples of the dihydric phenol represented by the general formula (iv) include bis(hydroxyaryl)alkanes, bis (hydroxyaryl)cycloalkanes, dihydroxyaryl ethers, dihydroxydiaryl sulfides, dihydroxydiaryl sulfoxides, dihydroxydiaryl sulfones, dihydroxydiphenyls, dihydroxydiarylfluorenes, and dihydroxydiaryladamantanes. Those dihydric phenols may be used alone or as a mixture thereof.

Examples of the bis(hydroxyaryl)alkanes include bis(4-hydroxyphenyl)methane, 1,1-bis(4-hydroxyphenyl)ethane, 2,2-bis(4-hydroxyphenyl)propane [bisphenol A], 2,2-bis(4-hydroxyphenyl)butane, 2,2-bis(4-hydroxyphenyl)octane, bis(4-hydroxyphenyl)phenylmethane, bis(4-hydroxyphenyl) diphenylmethane, 2,2-bis(4-hydroxy-3-methylphenyl)propane, bis(4-hydroxyphenyl)naphthylmethane, 1,1-bis(4-hydroxy-3-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane.

Examples of the bis(hydroxyaryl)cycloalkanes include 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane. Examples of the dihydroxyaryl ethers include 4,4'-dihydroxydiphenyl ether and 4,4'-dihydroxy-3,3'-dimethylphenyl ether.

Examples of the dihydroxydiaryls sulfide include 4,4'-dihydroxydiphenyl sulfide and 4,4'-dihydroxy-3,3'-dimethyldiphenyl sulfide. Examples of the dihydroxydiaryl sulfoxides include 4,4'-dihydroxydiphenyl sulfoxide and 4,4'-dihydroxy-3,3'-dimethyldiphenyl sulfoxide. Examples of the dihydroxydiaryl sulfones include 4,4'-dihydroxydiphenyl sulfone and 4,4'-dihydroxy-3,3'-dimethyldiphenyl sulfone.

An example of the dihydroxydiphenyls is 4,4'-dihydroxydiphenyl. Examples of the dihydroxydiarylfluorenes include 9,9-bis(4-hydroxyphenyl)fluorene and 9,9-bis(4-hydroxy-3-methylphenyl)fluorene. Examples of the dihydroxydiaryladamantanes include 1,3-bis(4-hydroxyphenyl)adamantane, 2,2-bis(4-hydroxyphenyl)adamantane, and 1,3-bis(4-hydroxyphenyl)-5,7-dimethyladamantane.

Examples of the dihydric phenol other than the above-mentioned dihydric phenols include 4,4'-[1,3-phenylenebis (1-methylethylidene)]bisphenol, 10,10-bis(4-hydroxyphenyl)-9-anthrone, and 1,5-bis(4-hydroxyphenylthio)-2,3-dioxapentane.

Among them, as the dihydric phenol, bis(hydroxyaryl) alkanes are preferred, bis(hydroxyphenyl)alkanes are more preferred, and bisphenol A is still more preferred. When bisphenol A is used as the dihydric phenol, a polycarbonate-polyorganosiloxane copolymer in which X represents an isopropylidene group and a relationship of a=b=0 is satisfied in the general formula (iv) can be provided.

In order to control the molecular weight of the PC-POS copolymer to be obtained, a terminal stopper can be used. Examples of the terminal stopper may include monohydric phenols, such as phenol, p-cresol, p-tert-butylphenol, p-tert-octylphenol, p-cumylphenol, p-nonylphenol, m-pentadecylphenol, and p-tert-amylphenol. Those monohydric phenols may be used alone or in combination thereof.

After the interfacial polycondensation reaction, the liquid is appropriately left at rest to be separated into an aqueous phase and an organic solvent phase, the organic solvent phase is washed (preferably washed with a basic aqueous solution, an acidic aqueous solution, and water in the stated order), and the resultant organic phase is concentrated and dried. Thus, the PC-POS copolymer can be obtained.

(Production Method for Aromatic Polycarbonate-Based Resin)

The aromatic polycarbonate-based resin can be obtained by a conventional production method for a polycarbonate. Examples of the conventional method include: an interfacial polymerization method involving causing the dihydric phenol-based compound and phosgene to react with each other in the presence of an organic solvent inert to the reaction and an aqueous alkaline solution, adding a polymerization catalyst, such as a tertiary amine or a quaternary ammonium salt, to the resultant, and polymerizing the mixture; and a pyridine method involving dissolving the dihydric phenol-based compound in pyridine or a mixed solution of pyridine and an inert solvent, and introducing phosgene to the solution to directly produce the resin. A molecular weight modifier (terminal stopper), a branching agent, or the like is used as required in the reaction.

The dihydric phenol-based compound is, for example, a compound represented by the following general formula (v):

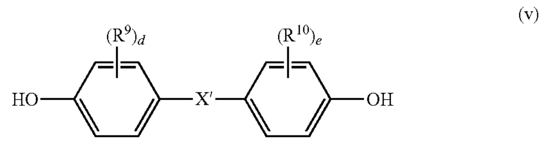

wherein $R^9$, $R^{10}$, X', d, and e are as defined above, and preferred examples thereof are also the same as those described above.

Specific examples of the dihydric phenol-based compound may include those described above in the method of producing the PC-POS copolymer (A1), and preferred examples thereof are also the same as those described above. Among them, a bis(hydroxyphenyl)alkane-based dihydric phenol is preferred, and bisphenol A is more preferred.

<White Pigment (B)>

The polycarbonate-based resin composition of the present invention contains the white pigment (B). The white pigment (B) is used as a coloring material for toning the color tone of the polycarbonate-based resin composition of the present invention to a white color or an intermediate color, such as a gray color. Although the white pigment (B) is not particularly limited, one or more selected from the group consisting of a titanium oxide pigment, a zinc sulfide pigment, a zinc oxide pigment, and a barium sulfate pigment are preferably used, and one or more selected from the group consisting of the titanium oxide pigment, the zinc sulfide pigment, and the zinc oxide pigment are more preferred. Among those white pigments, the titanium oxide pigment is preferably used from the viewpoint of making the color tone whiter. The white pigment (B) is described below by taking titanium oxide as a typical example, but the same holds true for any other white pigment described above.

Titanium oxide particles each serving as the core of the titanium oxide pigment (the titanium oxide particles each serving as the core of the titanium oxide pigment are hereinafter sometimes referred to as "titanium oxide particles" or simply "core particles") may be produced by any one of a chlorine method and a sulfuric acid method, but are preferably produced by the chlorine method in terms of the color tone of the composition. In addition, any one of a rutile-type structure and an anatase-type structure can be used as the crystal structure of the titanium oxide, but the rutile-type structure is preferred from the viewpoints of, for example, the thermal stability and light resistance of the polycarbonate-based resin composition.

The average particle diameter of the core particles is preferably from 0.10 μm to 0.45 μm, more preferably from 0.15 μm to 0.25 μm from the viewpoint of making the color tone whiter. The average particle diameter of the core particles is determined from the average of the particle diameters of primary particles based on single particles.

The titanium oxide pigment typically has, on the surface of each of the titanium oxide particles, an inorganic oxide layer comprising one or more inorganic oxides selected from the group consisting of silica, zirconia, and alumina. The inorganic oxide layer can suppress the catalytic activity of each of the titanium oxide particles serving as the core particles and impart light resistance to each of the particles. Further, the layer exhibits an effect of alleviating the agglomeration of the titanium oxide pigment in the resin composition to improve its dispersibility.

The titanium oxide pigment may have two or more of the inorganic oxide layers. In this case, the inorganic oxide layer positioned on a side close to each of the core particles contributes mainly to the suppression of the catalytic activity of the titanium oxide particle serving as the core particle and the impartment of light resistance thereto, and the inorganic oxide layer positioned on a side distant from the core particle contributes mainly to the alleviation of the agglomeration of the titanium oxide pigment in the resin composition and an improvement in dispersibility thereof.

When the titanium oxide pigment has two or more of the inorganic oxide layers, it is preferred that the inorganic oxide layer positioned on the side close to each of the core particles comprises one or more selected from the group consisting of silica and zirconia, and the inorganic oxide layer positioned on the side distant from the core particle comprises alumina.

While the inorganic oxide layer has a suppressing action on the catalytic activity of each of the titanium oxide particles serving as the core particles, silica, zirconia, and alumina serving as inorganic oxides are wettable inorganic substances, and hence each of the inorganic oxides has a high water absorption ratio and is liable to transpire moisture in a molding machine. The transpired moisture is responsible for the induction of the hydrolysis of a polycarbonate resin or for the occurrence of a silver streak on the surface of a molded article of the resin composition. In view of the foregoing, in order that the catalytic action of the titanium oxide may be suppressed, the inorganic oxide layer is preferably as thick as possible, and when an attempt is made to suppress the hydrolysis of the polycarbonate resin and the occurrence of a silver streak, the inorganic oxide layer is preferably as thin as possible.

In view of the trade-off relationship, the coverage of the titanium oxide pigment for coloring the polycarbonate-based resin composition with the inorganic oxide layer generally falls within the range of from 3 mass % to 10 mass % in terms of a mass ratio with respect to the entirety of the titanium oxide pigment. In the application of a white reflective material in which a white pigment concentration is high, its polycarbonate resin is liable to hydrolyze, and a silver streak is liable to occur, and which is used in a smartphone, the coverage of the titanium oxide pigment with the inorganic oxide layer preferably falls within the range of from 3 mass % to 5 mass % in terms of the mass ratio with respect to the entirety of the titanium oxide pigment. Meanwhile, in the application of a colored molded article for outdoors where light resistance is required, the coverage of the titanium oxide pigment with the inorganic oxide layer preferably falls within the range of from 5 mass % to 10 mass % in terms of the mass ratio with respect to the entirety of the titanium oxide pigment. However, even when the mass ratio is satisfied, it is difficult to completely suppress the catalytic action of the titanium oxide, and hence the deterioration of the weatherability of the composition by the catalytic action of the titanium oxide occurs. A main cause for the occurrence of a black streak in the injection molding of the polycarbonate-based resin composition containing the PC-POS copolymer and the white pigment, such as the titanium oxide pigment, is the catalytic action of the titanium oxide that has not been completely suppressed.

In more detail, it has been conventionally considered that in a polycarbonate resin containing a titanium oxide pigment, moisture in the titanium oxide pigment induces the hydrolysis of the polycarbonate resin under high temperature and high pressure in a molding machine, and as a result, a reduction in molecular weight of the polycarbonate resin is caused. With a view to confirming whether or not the consideration is correct, researchers have added a plurality of titanium oxide pigments having different moisture contents in equal amounts each to a polycarbonate resin, have kneaded the mixture with a twin-screw kneader, and have confirmed whether or not there is a correlation between a molecular weight reduction amount and the moisture content in each of the added titanium oxide pigments from a difference between the molecular weight of the resin before the kneading and that after the kneading. As a result, the researchers have found that there is not necessarily a correlation between the reduction amount and the moisture content, and have assumed that there exists a cause for the reduction in molecular weight except the hydrolysis of the resin. On the basis of the assumption, the researchers have found that the molecular weight is reduced by the catalytic action of each of the titanium oxide pigments.

Moisture in a titanium oxide pigment is not completely free of any influence on the decomposition of a polycarbonate resin, and evidently serves as a cause for the hydrolysis of the polycarbonate resin. Further, it has been known that high-temperature and high-pressure steam transpired in a molding machine accelerates the oxidation of an organic substance, such as a polycarbonate resin, and hence a titanium oxide pigment having a small moisture content is preferred. With regard to the amount of moisture in the titanium oxide pigment, a value obtained by subtracting a moisture concentration measured at from 0° C. to 120° C. by a Karl-Fischer method from a moisture concentration measured at from 0° C. to 300° C. by the Karl-Fischer method is preferably 8,000 ppm by mass or less. The value is more preferably 6,000 ppm by mass or less, still more preferably 4,000 ppm by mass or less, still further more preferably 3,000 ppm by mass or less.

The titanium oxide pigment has an organic layer on a surface thereof, and preferably has the organic layer on the surface of the inorganic oxide layer. The organic layer exhibits an effect of alleviating the agglomeration of the titanium oxide pigment in the resin composition to improve its dispersibility. In addition, the surface of the inorganic oxide layer in the titanium oxide pigment has a solid acid or solid base characteristic. The fact is as described on page 15 of "NEW TIPAQUE NEWS. Vo. 1 Titanium Dioxide Pigments: Basic Physical Properties" by Ishihara Sangyo Kaisha, Ltd. The solid acid or solid base characteristic is a property identical to acidity or basicity in a solution, and the property is not preferred because the hydrolysis of a polycarbonate resin is liable to be accelerated under each of both acidity and basicity. The solid acid or solid base characteristic is a characteristic of only the surface of the inorganic oxide layer in the titanium oxide pigment. Therefore, when the inorganic oxide layer is covered with the organic layer, direct contact between the inorganic oxide layer and the polycarbonate resin is suppressed, and hence an influence of an accelerating action on the hydrolysis exhibited by the acidity or the basicity can be reduced. In this point, the organic layer is effective in suppressing the hydrolysis of the PC-POS copolymer.

The highest peak temperature of the evolved gas analysis curve of the organic layer obtained by evolved gas analysis (hereinafter sometimes referred to as "EGA") with a pyrolysis gas chromatograph apparatus and a flame ionization detector (FID detector) is 390° C. or more. When the highest peak temperature of the organic layer is less than 390° C., the organic layer is liable to decompose even in the case where the melt kneading or molding of the polycarbonate-based resin composition is performed under a high-temperature condition. Accordingly, the action of the solid acid or solid base characteristic of the surface of the inorganic oxide layer in the titanium oxide pigment cannot be effectively suppressed, and hence a suppressing effect on the occurrence of a black streak by the hydrolysis of the PC-POS copolymer at the time of the molding of the resin composition is poor. The highest peak temperature of the organic layer is more preferably 400° C. or more, still more preferably 410° C. or more from the viewpoint of a black streak-suppressing effect. Although an upper limit value for the highest peak temperature of the organic layer is not particularly limited, the upper limit value is preferably 500° C. or less, more preferably 480° C. or less, still more preferably 450° C. or less in consideration of the general decomposition temperature of the organic layer.

The highest peak temperature can be specifically measured by a method described in Examples.

A compound for forming the organic layer is, for example, a silane-based compound, such as a silane coupling agent. Examples of the silane coupling agent include a vinyl-based silane coupling agent, an epoxy-based silane coupling agent, a methacrylic silane coupling agent, an acrylic silane coupling agent, and an amino-based silane coupling agent. Those compounds may be used alone or in combination thereof.

From the viewpoint of a preventing effect on an appearance failure, such as a black streak, at the time of the molding of the composition, a component detected by the gas chromatograph-mass spectrometry (GC-MS) of the organic layer preferably contains a silane-based compound. More specifically, the organic layer is preferably an organic layer in which the component detected by the gas chromatograph-mass spectrometry contains the constituent represented by the following group A.

[Group A]

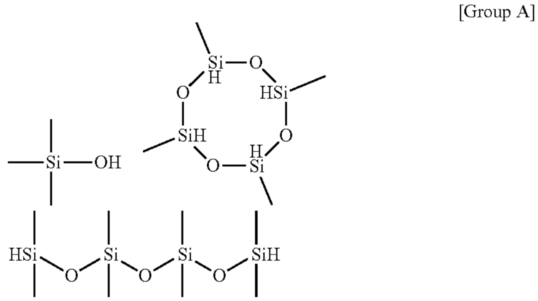

The shapes of the white pigment (B) are not particularly limited, and examples thereof include a flaky shape, a spherical shape, a plate shape, and an amorphous shape. The average particle diameter of the white pigment (B) is preferably from 0.05 μm to 0.50 μm, more preferably from 0.10 μm to 0.45 μm, still more preferably from 0.15 μm to 0.25 μm from the viewpoint of making the color tone more excellent white. The average particle diameter of the white pigment (B) is determined from the average of the particle diameters of primary particles based on single particles.

With regard to the amount of moisture in the white pigment (B), a value obtained by subtracting a moisture concentration measured at from 0° C. to 120° C. by a Karl-Fischer method from a moisture concentration measured at from 0° C. to 300° C. by the Karl-Fischer method is preferably 8,000 ppm by mass or less. The value is more preferably 6,000 ppm by mass or less, still more preferably 4,000 ppm by mass or less, still further more preferably 3,000 ppm by mass or less.

The foregoing description about the titanium oxide pigment is similarly applicable to the other white pigments, such as the zinc sulfide pigment, the zinc oxide pigment, and the barium sulfate pigment.

The content of the white pigment (B) in the polycarbonate-based resin composition of the present invention is 0.1 part by mass or more to 40 parts by mass or less, preferably 0.1 part by mass or more to 20 parts by mass or less, more preferably 1.0 part by mass or more to 10 parts by mass or less, still more preferably 1.0 part by mass or more to 5.0 parts by mass or less with respect to 100 parts by mass of the polycarbonate-based resin (A). When the content of the white pigment (B) is less than 0.1 part by mass, the whiteness of a molded article of the composition is insufficient, and when the content is more than 40 parts by mass, the impact resistance thereof reduces.

<Hydrolysis Resistant Agent (C)>

In the polycarbonate-based resin composition containing the white pigment (B), the hydrolysis of the PC-POS copolymer originating from moisture in the white pigment (B) occurs to no small extent. The polycarbonate-based resin composition of the present invention can be further blended with a hydrolysis resistant agent (C) for preventing the foregoing. When the polycarbonate-based resin composition containing the PC-POS copolymer (A1) and the white pigment (B) is further blended with the hydrolysis resistant agent (C), the occurrence of a black streak at the time of its molding can be suppressed.

The hydrolysis resistant agent in the present invention is an agent having a function of suppressing the hydrolysis of a carbonate group or a siloxane bond in the PC-POS copolymer (A1). In more detail, the agent is an agent having one or more functional groups that can react with moisture or a produced acid.

Specific examples of the hydrolysis resistant agent (C) to be used in the present invention include an amide compound (C1), an imide compound (C2), an epoxy compound (C3), an acid anhydride (C4), an oxazoline compound (C5), an oxazine compound (C6), and a ketene compound (C7).

(Amide Compound (C1))

The amide compound (C1) to be used in the present invention only needs to be a compound having at least one amide group in a molecule thereof.

The amide compound (C1) is preferably an amide compound having at least one chain aliphatic group having 6 to 24 carbon atoms in a molecule thereof in terms of its effect as a hydrolysis resistant agent and its dispersibility. The chain aliphatic group may be linear or branched, and may be a saturated aliphatic group or an unsaturated aliphatic group. Among them, a saturated chain aliphatic group is preferred from the viewpoint of suppressing the occurrence of a black streak at the time of the molding of the resin composition, and in terms of the fact that the group has an action of being dispersed in the polycarbonate-based resin, and an alkyl group is more preferred. The number of carbon atoms of the chain aliphatic group is preferably from 8 to 22, more preferably from 10 to 22, still more preferably from 12 to 22. The chain aliphatic group may have a substituent, such as a hydroxy group.

Among the amide compounds (C1), an amide compound having one amide group in a molecule thereof (hereinafter sometimes referred to as "monoamide") is preferably a compound represented by the following general formula (c1-a):

$$R^{11}-\overset{\overset{\displaystyle O}{\|}}{C}-\overset{H}{N}-R^{12} \quad \text{(c1-a)}$$

wherein $R^{11}$ represents a chain aliphatic group having 6 to 24 carbon atoms, and $R^{12}$ represents a hydrogen atom or a chain aliphatic group having 6 to 24 carbon atoms. A preferred mode of any such chain aliphatic group is the same as that described above, and the group may have a substituent, such as a hydroxy group.

Examples of the compound represented by the general formula (c1-a) include a fatty acid monoamide and a monoamide obtained by substituting amide hydrogen of the fatty acid monoamide with a chain aliphatic group having 6 to 24 carbon atoms (chain aliphatic group-substituted fatty acid monoamide). Among those described above, a fatty acid monoamide is preferred.

Specific examples of the fatty acid monoamide include caprylamide, capramide, lauramide, myristamide, palmitamide, stearamide, hydroxystearamide, 12-hydroxystearamide, behenamide, montanamide, undecylenamide, oleamide, erucamide, and linoleamide.

Specific examples of the chain aliphatic group-substituted fatty acid monoamide include N-lauryl lauramide, N-palmityl palmitamide, N-stearyl stearamide, N-behenyl behenamide, N-oleyl oleamide, N-stearyl oleamide, N-oleyl stearamide, N-stearyl erucamide, N-oleyl palmitamide, methylol stearamide, methylol behenamide, N-stearyl-12-hydroxystearamide, and N-oleyl-12-hydroxystearamide.

Among the amide compounds (C1), a compound having two amide groups in a molecule thereof is preferably a compound represented by any one of the following general formulae (c1-b) and (c1-c), more preferably a compound represented by the general formula (c1-b):

(c1-b)

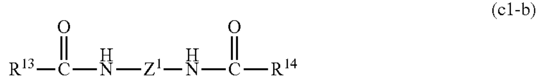

wherein $R^{13}$ and $R^{14}$ each independently represent a chain aliphatic group that has 6 to 24 carbon atoms and that may have a hydroxy group, and $Z^1$ represents a divalent group having 1 to 12 carbon atoms.

A preferred mode of the chain aliphatic group is the same as that described above, and the group may have a substituent, such as a hydroxy group. $R^{13}$ and $R^{14}$, which may be identical to or different from each other, are preferably identical to each other.

The number of carbon atoms of $Z^1$ is preferably from 1 to 8, more preferably from 2 to 6, still more preferably from 2 to 4. $Z^1$, which may represent any one of a chain aliphatic group, an alicyclic structure-containing group, and an aromatic ring-containing group, represents preferably a chain aliphatic group, more preferably an alkylene group.

(c1-c)

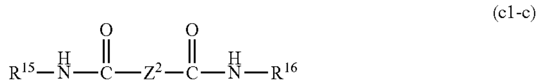

wherein $R^{15}$ and $R^{16}$ each independently represent a chain aliphatic group having 6 to 24 carbon atoms, and $Z^2$ represents a divalent group having 1 to 12 carbon atoms.

A preferred mode of the chain aliphatic group is the same as that described above, and the group may have a substituent, such as a hydroxy group. $R^{15}$ and $R^{16}$, which may be identical to or different from each other, are preferably identical to each other.

A preferred mode of $Z^2$ is the same as that of the Z.

A specific example of the compound represented by the general formula (c1-b) is a fatty acid bisamide. Examples thereof include methylenebiscaprylamide, methylenebiscapramide, methylenebislauramide, methylenebismyristamide, methylenebispalmitamide, methylenebisstearamide, methylenebisisostearamide, methylenebisbehenamide, methylenebisoleamide, methylenebiserucamide, ethylenebiscaprylamide, ethylenebiscapramide, ethylenebislauramide, ethylenebismyristamide, ethylenebispalmitamide, ethylenebisstearamide, ethylenebisisostearamide, ethylenebisbehenamide, ethylenebisoleamide, ethylenebiserucamide, butylenebisstearamide, butylenebisbehenamide, butylenebisoleamide, butylenebiserucamide, hexamethylenebisstearamide, hexamethylenebisbehenamide, hexamethylenebisoleamide, hexamethylenebiserucamide, m-xylylenebisstearamide, m-xylylenebis-12-hydroxystearamide, p-xylylenebisstearamide, p-phenylenebisstearamide, methylenebishydroxystearamide, ethylenebishydroxystearamide, butylenebishydroxystearamide, and hexamethylenebishydroxystearamide.

Specific examples of the compound represented by the general formula (c1-c) include N,N'-distearyl adipamide, N,N'-distearyl sebacamide, N,N'-dioleyl adipamide, N,N'-dioleyl sebacamide, N,N'-distearyl isophthalamide, and N,N'-distearyl terephthalamide.

Among the amide compounds (C1), a compound having three or more amide groups in a molecule thereof is preferably, for example, a polycondensate of a dicarboxylic acid, a diamine, and a monocarboxylic acid or a monoamine having a chain aliphatic group having 6 to 24 carbon atoms. A preferred mode of the chain aliphatic group having 6 to 24 carbon atoms is the same as that described above, and the group may have a substituent, such as a hydroxy group.

Among the amide compounds (C1), in terms of the effects of the present invention, one or more amide compounds selected from the group consisting of the compounds represented by the general formula (c1-a), the general formula (c1-b), and the general formula (c1-c) are more preferred, the compound represented by the general formula (c1-b) is still more preferred, and ethylenebisstearamide is still further more preferred. In addition, among the amide compounds (C1), a compound having a melting point of 100° C. or more, more preferably 150° C. or more is preferred because of its high suitability for the molding temperature of the polycarbonate-based resin composition.

Examples of a commercial product of the amide compound (C1) include "Light Amide WH-255" (manufactured by Kyoeisha Chemical Co., Ltd., N,N'-ethylenebisstearamide), "AMIDE AP-1" (manufactured by Nippon Kasei Chemical Co., Ltd., stearamide), "SLIPACKS E" (manufactured by Nippon Kasei Chemical Co., Ltd., ethylenebisstearamide), and "SLIPACKS H" (manufactured by Nippon Kasei Chemical Co., Ltd., ethylenebishydroxystearamide).

(Imide Compound (C2))

The imide compound (C2) to be used in the present invention is preferably a carbodiimide compound. The carbodiimide compound is a compound having at least one carbodiimide group in a molecule thereof, and examples thereof include a monocarbodiimide compound having one carbodiimide group in a molecule thereof and a polycarbodiimide compound having two or more carbodiimide groups in a molecule thereof. Among them, a polycarbodiimide compound is preferred from the viewpoint of suppressing the occurrence of a black streak at the time of the molding of the resin composition.

Examples of the carbodiimide compound include an aliphatic carbodiimide compound, an aromatic carbodiimide compound, a cyclic carbodiimide compound, and a compound obtained by partially carbodiimidizing an isocyanate compound (hereinafter sometimes referred to as "carbodiimide-modified compound").

As specific examples of an aliphatic monocarbodiimide compound, there are given diisopropylcarbodiimide, dioctyldecylcarbodiimide, dicyclohexylcarbodiimide, and N,N'-dioctyldecylcarbodiimide.

As specific examples of an aliphatic polycarbodiimide compound, there are given ethylenebis(dicyclohexylcarbodiimide), hexamethylenebis(dicyclohexylcarbodiimide), poly(diisopropylcarbodiimide), poly(1,6-hexamethylenecarbodiimide), poly(4,4'-methylenebiscyclohexylcarbodiimide), poly(1,3-cyclohexylenecarbodiimide), and poly(1,4-cyclohexylenecarbodiimide).

As specific examples of an aromatic monocarbodiimide compound, there are given di-p-chlorophenylcarbodiimide, di-o-chlorophenylcarbodiimide, di-3,4-dichlorophenylcarbodiimide, di-2,5-dichlorophenylcarbodiimide, 2,6,2',6'-tetraisopropyldiphenylcarbodiimide, N,N'-diphenylcarbodiimide, N,N'-di-o-toluylcarbodiimide, N,N'-di-2,6-dimethylphenylcarbodiimide, N-toluyl-N'-cyclohexylcarbodiimide, N,N'-bis(2,6-diisopropylphenyl)carbodiimide, N,N'-di-2,6-di-tert-butylphenylcarbothimide, N-toluyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-di-o-toluylcarbodiimide, N,N'-di-p-toluylcarbodiimide, N,N'-benzylcarbodiimide, N-octadecyl-N'-phenylcarbodiimide, N-benzyl-N'-phenylcarbodiimide, N-octadecyl-N'-tolylcarbodiimide, N-cyclohexyl- N'-tolylcarbodiimide, N-phenyl-N'-tolylcarbodiimide, N-benzyl-N'-tolylcarbodiimide, N,N'-di-o-ethylphenylcarbodiimide, N,N'-di-p-ethylphenylcarbodiimide, N,N'-di-o-isopropylphenylcarbodiimide, N,N'-di-p-isopropylphenylcarbodiimide, N,N'-di-o-isobutylphenylcarbodiimide, N,N'-di-p-isobutylphenylcarbodiimide, N,N'-di-2,6-diethylphenylcarbodiimide, N,N'-di-2-ethyl-6-isopropylphenylcarbodiimide, N,N'-di-2-isobutyl-6-isopropylphenylcarbodiimide, N,N'-di-2,4,6-trimethylphenylcarbodiimide, N,N'-di-2,4,6-triisopropylphenylcarbodiimide, and N,N'-di-2,4,6-triisobutylphenylcarbodiimide.

As specific examples of an aromatic polycarbodiimide compound, there are given p-phenylenebis(o-toluylcarbodiimide), p-phenylenebis(cyclohexylcarbodiimide), p-phenylenebis(p-chlorophenylcarbodiimide), ethylenebis(diphenylcarbodiimide), poly(4,4'-diphenylmethanecarbodiimide), poly(3,3'-dimethyl-4,4'-diphenylmethanecarbodiimide), poly(naphthylenecarbodiimide), poly(p-phenylenecarbodiimide), poly(m-phenylenecarbodiimide), poly(tolylcarbodiimide), poly(methyl-diisopropylphenylenecarbodiimide), poly(triethylphenylenecarbodiimide), and poly(trfisopropylphenylenecarbodiimide).

The cyclic structure of the cyclic carbodiimide compound has one carbodiimide group (—N═C═N—), and its first nitrogen and second nitrogen are bonded to each other by a bonding group. One cyclic structure has only one carbodiimide group therein. The number of atoms in the cyclic structure is preferably from 8 to 50, more preferably from 10 to 30, still more preferably from 10 to 20. The term "number of atoms in the cyclic structure" as used herein means the number of atoms directly forming the cyclic structure. For example, in the case of an eight-membered ring, the number of atoms is 8, and in the case of a fifty-membered ring, the number of atoms is 50.

The cyclic structure is, for example, a structure represented by the following formula (c2-a):

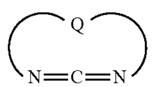

(c2-a)

wherein Q represents a divalent to tetravalent organic group.

Examples of the isocyanate compound to be used for the compound obtained by partially carbodiimidizing an isocyanate compound (carbodiimide-modified compound) include tolylene diisocyanate, phenylene diisocyanate, 4,4'-diphenylmethane diisocyanate, polymethylene polyphenyl polyisocyanate, dimethyl biphenylene diisocyanate, dimethoxy biphenylene diisocyanate, naphthalene diisocyanate, tetrahydronaphthalene diisocyanate, tetramethylene diisocyanate, hexamethylene diisocyanate, dodecamethylene diisocyanate, trimethyl hexamethylene diisocyanate, cyclohexylene diisocyanate, xylylene diisocyanate, hydrogenated xylylene diisocyanate, tetramethyl xylylene diisocyanate, lysine diisocyanate, isophorone diisocyanate, dicyclohexylmethane diisocyanate, and dimethyldicyclohexylmethane diisocyanate, and the compounds may be used alone or in combination thereof. Among the isocyanate compounds, an isocyanate compound containing 4,4'-diphenylmethane diisocyanate as a main component is preferred.

A known method can be used as a method of partially carbodiimidizing an isocyanate compound.

A compound having a molar ratio "carbodiimide group/isocyanate group" in the range of from 0.01 to 0.5 can be preferably used as the carbodiimide-modified compound, and a compound having a molar ratio in the range of from 0.1 to 0.2 is more preferred. When a compound having a molar ratio "carbodiimide group/isocyanate group" of 0.01 or more is used, its effect as a hydrolysis resistant agent is expressed, and hence the occurrence of a black streak at the time of the molding of the resin composition can be suppressed.

The imide compounds (C2) may be used alone or in combination thereof. Among those described above, the aliphatic carbodiimide compound is preferred, and the aliphatic polycarbodiimide compound is more preferred in terms of its effect as a hydrolysis resistant agent.

(Epoxy Compound (C3))

The epoxy compound (C3) to be used in the present invention only needs to be a compound having at least one epoxy group in a molecule thereof. Examples of the epoxy compound (C3) include a glycidyl ether compound, a glycidyl ester compound, a glycidyl amine compound, a glycidyl imide compound, a cyclic epoxy compound, and an epoxidized oil.

Examples of the glycidyl ether compound may include butyl glycidyl ether, stearyl glycidyl ether, allyl glycidyl ether, phenyl glycidyl ether, o-phenylphenyl glycidyl ether, ethylene oxide lauryl alcohol glycidyl ether, ethylene oxide phenol glycidyl ether, ethylene glycol diglycidyl ether, polyethylene glycol diglycidyl ether, propylene glycol diglycidyl ether, polypropylene glycol diglycidyl ether, neopentyl glycol diglycidyl ether, polytetramethylene glycol diglycidyl ether, cyclohexane dimethanol diglycidyl ether, glycerol triglycidyl ether, trimethylolpropane triglycidyl ether, pentaerythritol polyglycidyl ether, and a bisphenol A diglycidyl ether-type epoxy resin, a bisphenol F diglycidyl ether-type epoxy resin, or a bisphenol S diglycidyl ether-type epoxy resin obtained through a condensation reaction between bisphenols, such as 2,2-bis-(4-hydroxyphenyl)propane, 2,2-bis-(4-hydroxyphenyl)methane, or bis(4-hydroxyphenyl) sulfone, and epichlorohydrin.

Examples of the glycidyl ester compound may include benzoic acid glycidyl ester, p-toluic acid glycidyl ester, cyclohexanecarboxylic acid glycidyl ester, stearic acid glycidyl ester, lauric acid glycidyl ester, palmitic acid glycidyl ester, versatic acid glycidyl ester, oleic acid glycidyl ester, linoleic acid glycidyl ester, linolenic acid glycidyl ester, terephthalic acid diglycidyl ester, isophthalic acid diglycidyl ester, phthalic acid diglycidyl ester, naphthalenedicarboxylic acid diglycidyl ester, bibenzoic acid diglycidyl ester, methylterephthalic acid diglycidyl ester, hexahydrophthalic acid diglycidyl ester, tetrahydrophthalic acid diglycidyl ester, cyclohexanedicarboxylic acid diglycidyl ester, adipic acid diglycidyl ester, succinic acid diglycidyl ester, sebacic acid diglycidyl ester, dodecanedioic acid diglycidyl ester, octadecanedicarboxylic acid diglycidyl ester, trimellitic acid triglycidyl ester, and pyromellitic acid tetraglycidyl ester.

Examples of the glycidyl amine compound may include tetraglycidyl aminodiphenylmethane, triglycidyl-p-aminophenol, triglycidyl-m-aminophenol, diglycidylaniline, diglycidyl toluidine, N,N,N',N'-tetraglycidyl m-xylylenediamine, diglycidyl tribromoaniline, tetraglycidylbisaminomethylcyclohexane, triglycidyl cyanurate, and triglycidyl isocyanurate.

Examples of the glycidyl imide compound may include N-glycidylphthalimide, N-glycidyl-4-methylphthalimide, N-glycidyl-4,5-dimethylphthalimide, N-glycidyl-3-methylphthalimide, N-glycidyl-3,6-dimethylphthalimide, N-glycidyl-4-ethoxyphthalimide, N-glycidyl-4-chlorophthalimide, N-glycidyl-4,5-dichlorophthalimide, N-glycidyl-3,4,5,6-tetrabromophthalimide, N-glycidyl-4-n-butyl-5-bromophthalimide, N-glycidylsuccinimide, N-glycidylhexahydrophthalimide, N glycidyl-1,2,3,6-tetrahydrophthalimide, N-glycidylmaleimide, N-glycidyl-α,β-dimethylsuccinimide, N-glycidyl-α-ethylsuccinimide, and N-glycidyl-α-propylsuccinimide.

Examples of the cyclic epoxy compound may include 3',4'-epoxycyclohexylmethyl-3,4-epoxycyclohexanecarboxylate, bis(3,4-epoxycyclohexylmethyl) adipate, vinylcyclohexene diepoxide, N-methyl-4,5-epoxycyclohexane-1,2-dicarboxylic acid imide, N-ethyl-4,5-epoxycyclohexane-1,2-dicarboxylic acid imide, N-phenyl-4,5-epoxycyclohexane-1,2-dicarboxylic acid imide, N-naphthyl-4,5-epoxycyclohexane-1,2-dicarboxylic acid imide, and N-tolyl-3-methyl-4,5-epoxycyclohexane-1,2-dicarboxylic acid imide. Among them, 3',4'-epoxycyclohexylmethyl-3,4-epoxycyclohexanecarboxylate is preferred.

Examples of the epoxidized oil may include an epoxidized natural oil and an epoxidized synthetic oil. Specific examples of the epoxidized natural oil include an epoxidized soybean oil, an epoxidized linseed oil, an epoxidized rapeseed oil, and an epoxidized whale oil. Specific examples of the epoxidized synthetic oil may include diepoxystearyl epoxyhexahydrophthalate and an epoxidized fatty acid butyl ester. Among them, the epoxidized soybean oil or the epoxidized linseed oil has a high affinity for the polycarbonate-based resin and easily expresses a hydrolysis resistance effect.

The epoxy compounds (C3) may be used alone or in combination thereof. Among those described above, the cyclic epoxy compound or one or more epoxidized oils selected from the group consisting of the epoxidized natural oil and the epoxidized synthetic oil are preferred as the epoxy compound (C3).

(Acid Anhydride (C4))

The acid anhydride (C4) to be used in the present invention only needs to be a compound having at least one acid anhydride group in a molecule thereof, and examples thereof may include succinic anhydride, maleic anhydride, and phthalic anhydride. The examples may further include polymers each containing any one of the above-mentioned compounds as a monomer unit.

(Oxazoline Compound (C5))

The oxazoline compound (C5) to be used in the present invention only needs to be a compound having at least one oxazoline group in a molecule thereof, and examples thereof may include monooxazoline, bisoxazoline, and a polyoxazoline containing an oxazoline group-containing compound as a monomer unit.

(Oxazine Compound (C6))

The oxazine compound (C6) to be used in the present invention only needs to be a compound having at least one oxazine group in a molecule thereof, and examples thereof may include monooxazine, bisoxazine, and a polyoxazine containing an oxazine group-containing compound as a monomer unit.

(Ketene Compound (C7))

Examples of the ketene compound (C7) to be used in the present invention include ketene represented by the following formula:

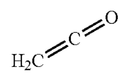

and diketene represented by the following formula:

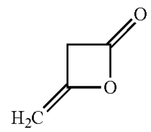

and an aldoketene obtained by substituting one hydrogen atom of the β-carbon of ketene with a substituent and ketoketenes obtained by substituting two hydrogen atoms thereof with substituents.

The hydrolysis resistant agents (C) may be used alone or in combination thereof. Among them, from the viewpoint of suppressing the occurrence of a black streak at the time of the molding of the resin composition, the black streak resulting from the hydrolysis of the PC-POS copolymer, one or more selected from the group consisting of the amide compound (C1), the imide compound (C2), and the epoxy compound (C3) are preferred as the hydrolysis resistant agent (C), one or more selected from the group consisting of the amide compound (C1) and the epoxy compound (C3) are more preferred, and one or more of the epoxy compounds (C3) selected from the group consisting of the epoxidized natural oil, the epoxidized synthetic oil, and the cyclic epoxy compound are still more preferred.

The blending amount of the hydrolysis resistant agent (C) in the polycarbonate-based resin composition of the present invention is preferably 0.02 part by mass or more to 5.0 parts by mass or less, more preferably 0.05 part by mass or more to 1.0 part by mass or less, still more preferably 0.1 part by mass or more to 0.5 part by mass or less with respect to 100 parts by mass of the polycarbonate-based resin (A). When the blending amount of the hydrolysis resistant agent (C) is 0.02 part by mass or more with respect to 100 parts by mass of the polycarbonate-based resin (A), the occurrence of a black streak at the time of the molding of the resin composition, the black streak resulting from the hydrolysis of the PC-POS copolymer, can be effectively suppressed. In addition, when the blending amount is 5.0 parts by mass or less, such an inconvenience as described below does not occur, which is preferred in terms of economical efficiency: a gas is produced at the time of the molding of the resin composition to adhere to a die.

A case in which the blending amount of the hydrolysis resistant agent (C) is 0.05 part by mass or more is preferred because a black streak occurring in a molded body molded at a certain back pressure is further suppressed. In addition, a case in which the blending amount is 0.1 part by mass or more is more preferred because a black streak occurring in a molded body molded at a higher back pressure is also further suppressed. In addition, a case in which the blending amount of the hydrolysis resistant agent (C) is 0.02 part by mass or more is preferred because the occurrence of a silver streak is also further suppressed.

<Antioxidant (D)>

The polycarbonate-based resin composition of the present invention preferably further comprises an antioxidant (D). When the polycarbonate-based resin composition comprises the antioxidant, the oxidative deterioration of the polycarbonate-based resin composition at the time of its melting can be prevented, and hence its coloring or the like due to the oxidative deterioration can be prevented. For example, a phosphorus-based antioxidant and/or a phenol-based antioxidant is suitably used as the antioxidant, and a phosphorus-based antioxidant is more preferred.

Examples of the phosphorus-based antioxidant include triphenyl phosphite, diphenylnonyl phosphite, diphenyl(2-ethylhexyl) phosphite, tris(2,4-di-t-butylphenyl) phosphite, tris(nonylphenyl) phosphite, diphenylisooctyl phosphite, 2,2'-methylenebis(4,6-di-t-butylphenyl)octyl phosphite, diphenylisodecyl phosphite, diphenyl mono(tridecyl) phosphite, phenyl diisodecyl phosphite, phenyl di(tridecyl) phosphite, tris(2-ethylhexyl) phosphite, tris(isodecyl) phosphite, tris(tridecyl) phosphite, dibutyl hydrogen phosphite, trilauryl trithiophosphite, tetrakis(2,4-di-t-butylphenyl)-4,4'-biphenylene diphosphonite, 4,4'-isopropylidenediphenol dodecyl phosphite, 4,4'-isopropylidenediphenol tridecyl phosphite, 4,4'-isopropylidenediphenol tetradecyl phosphite, 4,4'-isopropylidenediphenol pentadecyl phosphite, 4,4'-butylidenebis(3-methyl-6-t-butylphenyl)ditridecyl phosphite, bis(2,4-di-t-butylphenyl)pentaerythritol diphosphite, bis(2,6-di-t-butyl-4-methylphenyl)pentaerythritol diphosphite, bis(nonylphenyl)pentaerythritol diphosphite, distearyl-pentaerythritol diphosphite, phenyl bisphenol A pentaerythritol diphosphite, tetraphenyl dipropylene glycol diphosphite, 1,1,3-tris(2-methyl-4-di-tridecyl phosphite-5-t-butylphenyl)butane, 3,4,5,6-dibenzo-1,2-oxaphosphane, triphenylphosphine, diphenylbutylphosphine, diphenyloctadecylphosphine, tris(p-tolyl)phosphine, tris(p-nonylphenyl) phosphine, tris(naphthyl)phosphine, diphenyl (hydroxymethyl)phosphine, diphenyl(acetoxymethyl) phosphine, diphenyl(β-ethylcarboxyethyl)phosphine, tris(p-chlorophenyl)phosphine, tris(p-fluorophenyl)phosphine, benzyldiphenylphosphine, diphenyl(β-cyanoethyl)phosphine, diphenyl(p-hydroxyphenyl)phosphine, diphenyl(1,4-dihydroxyphenyl)-2-phosphine, and phenylnaphthylbenzylphosphine.

Examples of the phosphorus-based antioxidant may include commercially available products, such as Irgafos 168 (manufactured by BASF Japan Ltd., trademark), Irgafos 12 (manufactured by BASF Japan Ltd., trademark), Irgafos 38 (manufactured by BASF Japan Ltd., trademark), ADK STAB 2112 (manufactured by ADEKA Corporation, trademark), ADK STAB C (manufactured by ADEKA Corporation, trademark), ADK STAB 329K (manufactured by ADEKA Corporation, trademark), ADK STAB PEP36 (manufactured by ADEKA Corporation, trademark), JC-263 (manufactured by Johoku Chemical Co., Ltd., trademark), Sandstab P-EPQ (manufactured by Clariant International Ltd., trademark), Weston 618 (manufactured by General Electric Company, trademark), Weston 619G (manufactured by General Electric Company, trademark), Weston 624 (manufactured by General Electric Company, trademark), and Doverphos S-9228PC (manufactured by Dover Chemical Corporation, trademark).

Examples of the phenol-based antioxidant include hindered phenols, such as n-octadecyl-3-(3,5-di-t-butyl-4-hydroxyphenyl)propionate, 2,6-di-t-butyl-4-methylphenol, 2,2'-methylenebis(4-methyl-6-t-butylphenol), and pentaerythrityl-tetrakis[3-(3,5-di-t-butyl-4-hydroxyphenyl)propionate].

Among those antioxidants, antioxidants each having a pentaerythritol diphosphite structure, such as bis(2,6-di-tert-butyl-4-methylphenyl)pentaerythritol diphosphite and bis(2,4-di-tert-butylphenyl)pentaerythritol diphosphite, and triphenylphosphine are preferred.

Examples of the phenol-based antioxidant may include commercially available products, such as Irganox 1010 (manufactured by BASF Japan Ltd., trademark), Irganox 1076 (manufactured by BASF Japan Ltd., trademark), Irganox 1330 (manufactured by BASF Japan Ltd., trademark), Irganox 3114 (manufactured by BASF Japan Ltd., trademark), Irganox 3125 (manufactured by BASF Japan Ltd., trademark), BHT (manufactured by Takeda Pharmaceutical Company, trademark), Cyanox 1790 (manufactured by American Cyanamid Company, trademark), and Sumilizer GA-80 (manufactured by Sumitomo Chemical Co., Ltd., trademark).

The antioxidants (D) may be used alone or in combination thereof.

The blending amount of the antioxidant (D) in the polycarbonate-based resin composition of the present invention is preferably 0.001 part by mass or more to 0.5 part by mass or less, preferably 0.01 part by mass or more to 0.3 part by mass or less, more preferably 0.05 part by mass or more to 0.3 part by mass or less with respect to 100 parts by mass of the polycarbonate-based resin (A). When the amount of the component (D) with respect to 100 parts by mass of the polycarbonate-based resin (A) falls within the range, a sufficient antioxidant action is obtained and the contamination of a die at the time of the molding of the composition can be suppressed.

<Other Additive>

The polycarbonate-based resin composition of the present invention may comprise any other additive to the extent that the effects of the present invention are not impaired. Examples of the other additive may include a metal deactivator, a UV absorber, a flame retardant, a flame retardant auxiliary, a release agent, a reinforcing material, a filler, an elastomer for improving impact resistance, and a dye.

The polycarbonate-based resin composition of the present invention is obtained by: blending the above-mentioned respective components at the above-mentioned ratios and various optional components to be used as required at appropriate ratios; and kneading the components.

The blending and the kneading may be performed by a method involving premixing with a typically used apparatus, such as a ribbon blender or a drum tumbler, and using, for example, a Henschel mixer, a Banbury mixer, a single-screw extruder, a twin-screw extruder, a multi-screw extruder, or a Ko-kneader. In normal cases, a heating temperature at the time of the kneading is appropriately selected from the range of 240° C. or more to 320° C. or less. An extruder may be used for molding the melt-kneading material, in particular a vented extruder is preferred.

[Molded Article]

A molded article of the present invention comprises the polycarbonate-based resin composition of the present invention. The molded article can be produced through molding the melt-kneading material with the above molding machine, or by using a pellet obtained from the composition as a raw material and by molding the pellet by an injection molding method, an injection compression molding method, an extrusion molding method, a blow molding method, a press molding method, a vacuum molding method, a foam molding method, and the like. In particular, the molded article is preferably produced by molding the resultant pellet by the injection molding method or the injection compression molding method.

In the production of the molded article containing the polycarbonate-based resin composition, from the viewpoints of preventing the inclusion of moisture in a production process and suppressing the occurrence of a black streak at the time of the molding of the resin composition, the molded article is preferably produced under such a condition that the residence time of the polycarbonate-based resin composition in the molding machine is shortened. A preferred mode of a method of producing the molded article based on the injection molding method or the injection compression molding method is, for example, as described below.

In the production of the molded article based on the injection molding method or the injection compression molding method, a pellet comprising the polycarbonate-based resin composition is preferably melted and plasticized with an injection molding machine including a screw. From the viewpoint of suppressing the occurrence of a black streak, the molding machine is preferably of a low-compression screw type, and the shape of the screw is preferably a full-flighted screw.

The back pressure of the screw is preferably set within a low range from the viewpoints of suppressing shear heating and suppressing the compression of the resin composition to suppress the occurrence of a black streak. The back pressure can be appropriately selected in accordance with an apparatus to be used and the like, and for example, when the composition is molded with an electric injection molding machine in which a pressure in a cylinder can be subjected to direct pressure control, the back pressure falls within the range of from about 2 MPa to about 10 MPa (this does not apply to a hydraulic injection molding machine because the pressure is adjusted by a hydraulic cylinder system). From the same viewpoints, the number of revolutions of the screw is also preferably set within a low range, and falls within the range of, for example, from 60 rpm to 80 rpm.

A temperature (cylinder temperature) at the time of the molding is preferably set to, for example, from 260° C. to 320° C. from the viewpoint of reducing the viscosity of the polycarbonate-based resin composition to smooth its flow.

With regard to the impact strength of the molded article of the present invention, from the viewpoint of the exhibition of a sufficient impact characteristic and from the viewpoint of the ease with which the molded article is produced, a value for its notched Izod impact strength at −40° C. measured by a method described in Examples is preferably from 30 kJ/m$^2$ to 100 kJ/m$^2$, more preferably from 35 kJ/m$^2$ to 80 kJ/m$^2$, still more preferably from 40 kJ/m$^2$ to 70 kJ/m$^2$, most preferably from 45 kJ/m$^2$ to 60 kJ/m$^2$.

The molded article of the present invention can be suitably used in, for example, parts for electrical and electronic equipment, such as a television, a radio-cassette player, a video camera, a videotape recorder, an audio player, a DVD player, an air conditioner, a cellular phone, a display, a computer, a register, an electronic calculator, a copying machine, a printer, or a facsimile, or casings for the electrical and electronic equipment, parts for the interior and exterior of lighting equipment, parts for the interior and exterior of a vehicle, food trays, and eating utensils. In particular, the molded article is suitable as a material for a casing for a cellular phone, a mobile personal computer, a digital camera, a video camera, an electric tool, or the like.

EXAMPLES

Examples of the present invention are further described. The present invention is by no means limited by those examples. Measurement and evaluations in the respective examples were performed by the following methods.

(Measurement of Chloroformate Group Concentration)

Measurement was performed on the basis of a chlorine ion concentration with reference to JIS-K8203 by using oxidation-reduction titration and silver nitrate titration.

(Measurement of Weight-Average Molecular Weight (Mw))

A weight-average molecular weight (Mw) was measured as a molecular weight in terms of standard polystyrene (weight-average molecular weight: Mw) by GPC [column: TOSOH TSK-GEL MULTIPORE HXL-M (two)+Shodex KF801 (one), temperature: 40° C., flow rate: 1.0 mL/min, detector: RI] through the use of tetrahydrofuran as a developing solvent.

(Average Chain Length and Content of Polydimethylsiloxane)

The average chain length and content of a polydimethylsiloxane were calculated by NMR measurement from the integrated value ratio of a methyl group of the polydimethylsiloxane.

<Quantification Method for Average Chain Length of Polydimethylsiloxane>

$^1$H-NMR Measurement Conditions

NMR apparatus: ECA500 manufactured by JEOL Resonance Inc.
Probe: 50TH5AT/FG2
Observed range: −5 ppm to 15 ppm
Observation center: 5 ppm
Pulse repetition time: 9 sec
Pulse width: 45°
NMR sample tube: 5φ
Sample amount: 30 mg to 40 mg
Solvent: deuterochloroform
Measurement temperature: room temperature
Number of scans: 256 times In the Case of Allylphenol-terminated Polydimethylsiloxane A: an integrated value of a methyl group in a dimethylsiloxane moiety observed around δ −0.02 to δ 0.5

B: an integrated value of a methylene group in allylphenol observed around δ 2.50 to δ 2.75

Chain length of polydimethylsiloxane=(A/6)/(B/4)

In the Case of Eugenol-terminated Polydimethylsiloxane

A: an integrated value of a methyl group in a dimethylsiloxane moiety observed around δ −0.02 to δ 0.5

B: an integrated value of a methylene group in eugenol observed around δ 2.40 to δ 2.70

Chain length of polydimethylsiloxane=(A/6)/(B/4)

<Quantification Method for Content of Polydimethylsiloxane in PC-PDMS Copolymer>

Quantification Method for Copolymerization Amount of Polydimethylsiloxane in PTBP-terminated Polycarbonate obtained by copolymerizing Allylphenol-terminated Polydimethylsiloxane NMR apparatus: ECA-500 manufactured by JEOL Resonance Inc.
Probe: TH5 corresponding to 5φ NMR sample tube
Observed range: −5 ppm to 15 ppm
Observation center: 5 ppm
Pulse repetition time: 9 sec
Pulse width: 45°
Number of scans: 256 times
NMR sample tube: 5φ
Sample amount: 30 mg to 40 mg
Solvent: deuterochloroform
Measurement temperature: room temperature A: an integrated value of a methyl group in a BPA moiety observed around δ 1.5 to δ 1.9

B: an integrated value of a methyl group in a dimethylsiloxane moiety observed around δ −0.02 to δ 0.3

C: an integrated value of a butyl group in a p-tert-butylphenyl moiety observed around δ 1.2 to δ 1.4

$$a=A/6$$

$$b=B/6$$

$c = C/9$ $T = a + b + c$ $f = a/T \times 100$ $g = b/T \times 100$ $h = c/T \times 100$ $TW = f \times 254 + g \times 74.1 + h \times 149$ $PDMS(\text{wt }\%) = g \times 74.1/TW \times 100$ (Measurement of Viscosity-Average Molecular Weight (Mv))

A viscosity-average molecular weight (Mv) was calculated from the following equation (Schnell's equation) by using a limiting viscosity [η] determined through the measurement of the viscosity of a methylene chloride solution (concentration: g/L) at 20° C. with an Ubbelohde-type viscometer.

$$[\eta] = 1.23 \times 10^{-5} \times Mv^{0.83}$$

Synthesis Example 1

(Synthesis of Polycarbonate Oligomer)

Sodium dithionite was added in an amount of 2,000 ppm by mass with respect to bisphenol A to be dissolved later to 5.6 mass % aqueous sodium hydroxide, and bisphenol A was dissolved in the mixture so that the concentration of bisphenol A was 13.5 mass %. Thus, a solution of bisphenol A in aqueous sodium hydroxide was prepared.

The solution of bisphenol A in aqueous sodium hydroxide, methylene chloride, and phosgene were continuously passed through a tubular reactor having an inner diameter of 6 mm and a tube length of 30 m at flow rates of 40 L/hr, 15 L/hr, and 4.0 kg/hr, respectively. The tubular reactor had a jacket portion and the temperature of a reaction liquid was kept at 40° C. or less by passing cooling water through the jacket.

The reaction liquid that had exited the tubular reactor was continuously introduced into a baffled vessel-type reactor having an internal volume of 40 L provided with a swept-back blade, and then the solution of bisphenol A in aqueous sodium hydroxide, 25 mass % aqueous sodium hydroxide, water, and a 1 mass % aqueous solution of triethylamine were further added to the reactor at flow rates of 2.8 L/hr, 0.07 L/hr, 17 L/hr, and 0.64 L/hr, respectively, to thereby perform a reaction. The reaction liquid flowing out of the vessel-type reactor was continuously taken out, and then an aqueous phase was separated and removed by leaving the liquid at rest, followed by the collection of a methylene chloride phase.

The concentration of the polycarbonate oligomer thus obtained was 318 g/L and the concentration of a chloroformate group thereof was 0.75 mol/L. In addition, the weight-average molecular weight (Mw) of the oligomer was 1,190.

Production Example 1

(Production of Polycarbonate-Polydimethylsiloxane Copolymer (PC-PDMS 1))

15 L of the polycarbonate oligomer solution produced in Synthesis Example 1, 8.9 L of methylene chloride, 307 g of a 2-allylphenol terminal-modified polydimethylsiloxane (PDMS-1) in which the average chain length of a polydimethylsiloxane block was 90, and 8.8 mL of triethylamine were loaded into a 50-liter vessel-type reactor including a baffle board, a paddle-type stirring blade, and a cooling jacket. 1,389 g of 6.4 mass % aqueous sodium hydroxide was added to the mixture under stirring to perform a reaction between the polycarbonate oligomer and the 2-allylphenol terminal-modified polydimethylsiloxane for 10 minutes.

A solution of p-t-butylphenol (PTBP) in methylene chloride (prepared by dissolving 129 g of PTBP in 2.0 L of methylene chloride) and a solution of bisphenol A in aqueous sodium hydroxide (prepared by dissolving 1,147 g of bisphenol A in an aqueous solution prepared by dissolving 581 g of sodium hydroxide and 2.3 g of sodium dithionite in 8.5 L of water) were added to the polymerization liquid to perform a polymerization reaction for 50 minutes. 10 L of methylene chloride was added to the resultant for dilution and the mixture was stirred for 10 minutes. After that, the mixture was separated into an organic phase containing a polycarbonate-polydimethylsiloxane copolymer, and an aqueous phase containing excess amounts of bisphenol A and sodium hydroxide, and the organic phase was isolated.

The solution of the polycarbonate-polydimethylsiloxane copolymer in methylene chloride thus obtained was sequentially washed with 0.03 mol/L aqueous sodium hydroxide and 0.2 mol/L hydrochloric acid in amounts of 15 vol % each with respect to the solution. Next, the solution was repeatedly washed with pure water until an electric conductivity in an aqueous phase after the washing became 0.01 μS/m or less. The solution of the polycarbonate-polydimethylsiloxane copolymer in methylene chloride obtained by the washing was concentrated and pulverized, and the resultant flake was dried under reduced pressure at 120° C.

The polycarbonate-polydimethylsiloxane copolymer (PC-PDMS 1) obtained as described above had a polydimethylsiloxane residue amount determined by $^{1}$H-NMR measurement of 6.0 mass %, a viscosity number measured in conformity with ISO 1628-4 (1999) of 47.4, and a viscosity-average molecular weight (Mv) of 17,600.

(Measurement of Concentration of Moisture in White Pigment)

White pigment powder serving as a sample was left to stand at a constant temperature of 25° C. and a constant relative humidity of 55% for 24 hours to be brought into an equilibrium state. After that, the moisture concentration of 0.3 g of the sample at a temperature of from 0° C. to 300° C. was measured with a Karl-Fischer moisture-measuring apparatus "COULOMETRIC MOISTURE METER CA-100" and a moisture-vaporizing apparatus "VA-100" attached thereto (both the apparatus were manufactured by Dia Instruments Co., Ltd.) at a nitrogen flow rate of about 250 mL. After that, a moisture concentration detected and integrated at from 0° C. to 120° C. was subtracted from the measured value, and the resultant value was defined as the amount of chemically bonded water held at 120° C. or more (to 300° C.).

(Measurement of Highest Peak Temperature of EGA Curve of Organic Layer with Pyrolysis Gas Chromatograph)

<Used Apparatus>

Pyrolysis apparatus: "PY-3030D" manufactured by Frontier Laboratories, Ltd.

Gas chromatograph (GC) apparatus: 7890BGC SYSTEM manufactured by Agilent Technologies, Inc.

Column: "UADTM-2.5N" manufactured by Frontier Laboratories, Ltd. (measuring 2.5 m in length by 0.15 mm in inner diameter)

<Pyrolysis Furnace Temperature Increase Condition>

100° C. (0 min)→temperature increase at 20° C./min→800° C.

<GC Conditions>

Carrier gas (He) flow velocity: 1 mL/min

Split ratio: 10:1

Injection port temperature: 300° C.

Oven: 300° C. (constant)

Detector: A flame ionization detector (FID) at 300° C.

<Measurement Procedure>

0.5 mg of a sample (titanium oxide pigment) was weighed in a sample cup, and the sample cup was mounted to the pyrolysis apparatus. Next, the sample cup was dropped into the pyrolysis furnace. Immediately after that, an increase in temperature of the pyrolysis furnace was started, and at the same time, GC measurement was started. A temperature at the peak top of the resultant EGA curve was defined as the highest peak temperature.

(GC-MS Analysis of Organic Layer)

<Used Apparatus>

Measuring apparatus: A small thermal desorption unit TDU and a multifunctional autosampler MPS manufactured by Gerstel, and a GC/MS apparatus "6890/5975MSD" manufactured by Agilent Technologies, Inc.

Column: "DB-5MS" manufactured by Agilent Technologies, Inc. (measuring 30 mm by 0.25 mm by 0.25 μm)

<TDU Portion Conditions>

TDU portion: 50° C. (0.01 min)→720° C./min→300° C. (20 min) splitless

CIS portion: −50° C. (0.01 min)→12° C./sec→350° C. (5 min) split 30:1

<GC-MS Conditions>

Carrier gas (He) flow velocity: 1 mL/min

Oven: 50° C. (5 min)→10° C./min→330° C. (10 min)

Scan range m/z=35 to 800

<Analysis Procedure>

10 mg of a sample (titanium oxide pigment) was weighed in a dedicated container, and the container was mounted to the TDU/GC-MS apparatus. Next, GC-MS measurement was performed under the foregoing conditions, and the resultant evolved gas component was identified by using the mass library of the National Institute of Standards and Technology (NIST).

In the following description of the organic layer of the white pigment, when a component detected by the GC-MS analysis of the organic layer belonged to the following group A, the organic layer is referred to as "organic layer A."

[Group A]

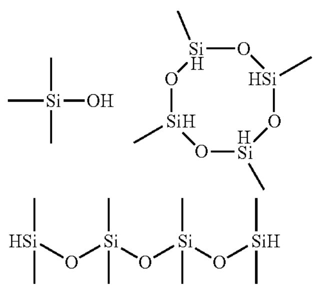

Examples 1 and 2 and Comparative Examples 1 to 8

Components shown in Table 1 were blended in blending amounts shown in the table. The mixture was supplied to a vented twin-screw extruder ("TEM-35B" manufactured by Toshiba Machine Co., Ltd.), and was melt-kneaded at a screw revolution number of 250 rpm, an ejection amount of 25 kg/hr, and a barrel preset temperature of 280° C. (actual extrusion temperature: 295° C. to 300° C.) to provide a pellet.

(1) Observation of Appearance Failures (Silver Streak and Black Streak) of Molded Article Each of the pellets was preliminarily dried with a dryer at 120° C. for 8 hours, and then injection molding was performed with an injection molding machine ("ES1000" manufactured by Nissei Plastic Industrial Co., Ltd.) under the following conditions for 20 shots. The appearance of the resultant molded article was visually observed, and was evaluated in accordance with the following criteria.

Specifically, each of the pellets was supplied from a hopper into a cylinder, and while the number of revolutions of a screw for plasticizing and kneading the pellet was set to 80 rpm, and the setting of the back pressure of the screw was changed in six stages, i.e., 4 MPa, 10 MPa, 20 MPa, 30 MPa, 40 MPa, and 50 MPa, the injection molding was performed for each example in order of increasing screw back pressure. As the screw back pressure is increased, a black streak-like appearance failure is more liable to occur. Meanwhile, in general, a silver streak is less liable to occur as the plasticization is stabilized (the back pressure becomes higher). In view of the foregoing, a black streak evaluation was performed for each of the molded articles corresponding to all the conditions under which the injection molding was performed, and a silver streak evaluation was performed only at the lowest screw back pressure (4 MPa) at which the plasticization of materials for any such molded article in the molding machine was stabilized. In the table, the evaluation "A" means that a silver streak and a black streak-like pattern hardly occur, and hence an evaluation result is satisfactory.

A: A silver streak or a black streak-like pattern is not observed on the surface of a molded article at all.

B: A silver streak or a black streak-like pattern is observed on the surface of a molded article.

(2) Observation of Black Streak (Transmission)

A frame having the same size as that of each of the molded articles was opened in a wooden plate having a size sufficiently larger than that of the molded article, and the molded article was fit into the frame. One side of the molded article was irradiated with light from a 110 V×1.5 kW lamp, and the molded article was observed from the side opposite thereto and evaluated in accordance with the following criteria.

In the table, a larger value for the screw back pressure at which the evaluation "A" is obtained means that an appearance failure more hardly occurs, and hence an evaluation result is more satisfactory.

A: No black streak-like pattern is observed.

B: A black streak-like pattern is slightly observed.

C: A black streak-like pattern is clearly observed.

(Injection Molding Conditions)

Die: flat die measuring 150 mmW by 150 mmH by 2 mmt

Die temperature: 80° C.

Cylinder temperature setting: each part was set at 290° C./280° C./270° C./260° C. in the order of NH/H1/H2/H3 from the nozzle side Injection speed: 120 mm/sec (3) Whiteness Reduction Degree of Molded Article A resin composition pellet was obtained by the same formulation and method as those of each example except that the flake of the PC-PDMS 1 synthesized in Production Example 1 was changed to a polycarbonate resin "TARFLON FN1700" manufactured by Idemitsu Kosan Co., Ltd., the resin having substantially the same viscosity-average molecular weight as that of the PC-PDMS 1. A sample for comparison was molded out of the resultant pellet by using the same drying conditions, molding machine, die, and molding conditions as the conditions for the evaluation of the appearance of a molded article. The sample molded at a screw back pressure set to the lowest value, i.e., 10 kg/cm$^2$ out of the samples used in the evaluation of the appearance of a molded article and the sample for comparison were visually compared to each other, and a difference in whiteness therebetween was evaluated in accordance with the following criteria.

A: No large difference in whiteness was present between the sample and the sample for comparison.

B: A slight reduction in whiteness was observed in the sample in comparison with the sample for comparison.

C: The whiteness of the sample in the comparison with the sample for comparison evidently reduced.

(4) Molecular Weight Reduction Ratio of Pellet

The viscosity-average molecular weight (Mv0) of the polycarbonate-based resin composition in each example before its kneading was calculated from the viscosity-average molecular weights of the PC-PDMS 1 obtained in Production Example 1 and an aromatic polycarbonate resin "TARFLON FN2200" manufactured by Idemitsu Kosan Co., Ltd., and a blending ratio therebetween shown in each table. Next, the viscosity-average molecular weight (Mv1) of the pellet obtained in each example was measured, and then the reduction ratio of the viscosity-average molecular weight of the pellet was determined from the following equation and evaluated in accordance with the following criteria.

$$\text{Molecular weight reduction ratio of pellet (\%)} = (Mv0-Mv1)/(Mv0)\times 100$$

A: The reduction ratio of the viscosity-average molecular weight is 3% or less.

B: The reduction ratio of the viscosity-average molecular weight is more than 3% and 8% or less.

C: The reduction ratio of the viscosity-average molecular weight is more than 8%.

TABLE 1

| | | | | Example | Comparative Example | | | |
|---|---|---|---|---|---|---|---|---|
| | | | | 1 | 1 | 2 | 3 | 4 |
| Formulation of resin composition | (A1-1) PC-PDMS copolymer (Mv = 17,600) | PC-PDMS 1 of Production Example 1 | Part(s) by mass | 80 | 80 | 80 | 80 | 80 |
| | (A2-1) Aromatic PC resin (Mv = 21,000) | FN2200 | Part(s) by mass | 20 | 20 | 20 | 20 | 20 |
| | (B-1) Titanium oxide | PF-728 | Part(s) by mass | 3 | | | | |
| | (b-1) Titanium oxide | CR-63 | Part(s) by mass | | | 3 | | |
| | (b-2) Titanium oxide | PC-690 | Part(s) by mass | | 3 | | | 3 |
| | (b-3) Titanium oxide | PF-726 | Part(s) by mass | | | | 3 | |
| | (C3-1) Epoxidized linseed oil | SANSO CIZER E-9000H | Part(s) by mass | 0.20 | 0.20 | 0.20 | | |
| | (D-1) Antioxidant | IRGAFOS 168 | Part(s) by mass | 0.10 | 0.10 | 0.10 | 0.10 | 0.10 |
| | Mv of component (A) | | | 18,280 | 18,280 | 18,280 | 18,280 | 18,280 |

| | | | | Comparative Example | Example | Comparative Example | | |
|---|---|---|---|---|---|---|---|---|
| | | | | 5 | 2 | 6 | 7 | 8 |
| Formulation of resin composition | (A1-1) PC-PDMS copolymer (Mv = 17,600) | PC-PDMS 1 of Production Example 1 | Part(s) by mass | 80 | 80 | 80 | 80 | 80 |
| | (A2-1) Aromatic PC resin (Mv = 21,000) | FN2200 | Part(s) by mass | 20 | 20 | 20 | 20 | 20 |
| | (B-1) Titanium oxide | PF-728 | Part(s) by mass | | 3 | | | |
| | (b-1) Titanium oxide | CR-63 | Part(s) by mass | 3 | | | | 3 |
| | (b-2) Titanium oxide | PC-690 | Part(s) by mass | | | | 3 | |
| | (b-3) Titanium oxide | PF-726 | Part(s) by mass | | | 3 | | |
| | (C3-1) Epoxidized linseed oil | SANSO CIZER E-9000H | Part(s) by mass | | 0.40 | 0.40 | 0.40 | 0.40 |
| | (D-1) Antioxidant | IRGAFOS168 | Part(s) by mass | 0.10 | 0.10 | 0.10 | 0.10 | 0.10 |
| | Mv of component (A) | | | 18,280 | 18,280 | 18,280 | 18,280 | 18,280 |

TABLE 1-continued

| | | | Example | | | | Comparative Example | | | | | | | | | | | |
|---|---|---|---|---|---|---|---|---|---|---|---|---|---|---|---|---|---|---|
| | | | 1 | | | | 1 | | | 2 | | | 3 | | 4 | | 5 | |
| Back pressure at time of molding | | kg/cm$^2$ | 4 | 10 | 20 | 30 | 4 | 10 | 20 | 4 | 10 | 20 | 4 | 10 | 4 | 10 | 4 | 10 |
| Evaluation result | Appearance of molded article | Silver streak | A | — | — | — | A | — | — | A | — | — | B | — | B | — | B | — |
| | | Black streak | A | A | A | B | A | B | B | A | B | B | B | C | B | C | B | C |
| | Black streak (transmission) | | A | A | B | C | A | B | C | A | B | C | B | C | B | C | B | C |
| | Whiteness reduction degree of molded article | | B | | | | B | | | B | | | B | | B | | B | |
| | Molecular weight reduction ratio of pellet | | A | | | | B | | | A | | | C | | C | | C | |

| | | | Example | | | | Comparative Example | | | | | | | | |
|---|---|---|---|---|---|---|---|---|---|---|---|---|---|---|---|
| | | | 2 | | | | 6 | | | 7 | | | 8 | | |
| Back pressure at time of molding | | kg/cm$^2$ | 4 | 10 | 20 | 30 | 4 | 10 | 20 | 4 | 10 | 20 | 4 | 10 | 20 |
| Evaluation result | Appearance of molded article | Silver streak | A | — | — | — | A | — | — | A | — | — | A | — | — |
| | | Black streak | A | A | A | B | A | B | C | A | B | B | A | A | B |
| | Black streak (transmission) | | A | A | A | B | A | B | C | A | B | C | A | A | C |
| | Whiteness reduction degree of molded article | | C | | | | C | | | C | | | C | | |
| | Molecular weight reduction ratio of pellet | | A | | | | A | | | A | | | A | | |

The components used in the tables are as described below.

(A1-1) PC-PDMS copolymer: PC-PDMS 1 (Mv: 17,600) obtained in Production Example 1

(A2-1) Aromatic polycarbonate-based resin: "FN2200" (Mv: 21,000) manufactured by Idemitsu Kosan Co., Ltd.

(B-1) Titanium oxide pigment: "PF-728" manufactured by Ishihara Sangyo Kaisha, Ltd. (crystal structure: rutile type, titanium dioxide subjected to a surface treatment with 8% of silica-alumina and a silane coupling agent, average particle diameter: 0.21 μm, amount of chemically bonded water: 4,500 ppm by mass, organic layer A, highest peak temperature of an EGA curve: 420° C.)

(b-1) Titanium oxide pigment: "CR-63" manufactured by Ishihara Sangyo Kaisha, Ltd. (crystal structure: rutile type, titanium dioxide subjected to a surface treatment with 3% of silica-alumina and dimethyl silicone, average particle diameter: 0.21 μm, amount of chemically bonded water: 2,600 ppm by mass, highest peak temperature of an EGA curve: 380° C.)

(b-2) Titanium oxide pigment: "PC-690" manufactured by Ishihara Sangyo Kaisha, Ltd. (crystal structure: rutile type, titanium dioxide subjected to a surface treatment with 7% of silica-alumina and a polyol, average particle diameter: 0.21 μm, amount of chemically bonded water: 5,100 ppm by mass, highest peak temperature of an EGA curve: 370° C.)

(b-3) Titanium oxide pigment: "PF-726" manufactured by Ishihara Sangyo Kaisha, Ltd. (crystal structure: rutile type, titanium dioxide subjected to a surface treatment only with 8% of silica-alumina, average particle diameter: 0.21 μm, amount of chemically bonded water: 5,100 ppm by mass)

(C3-1) Epoxidized linseed oil: "SANSO CIZER E-900011" manufactured by New Japan Chemical Co., Ltd.

(D-1) Antioxidant: "IRGAFOS 168" (tris(2,4-di-t-butylphenyl) phosphite) manufactured by BASF Japan Ltd.

INDUSTRIAL APPLICABILITY

The polycarbonate-based resin composition of the present invention can provide a white molded article having satisfactory molding appearance because the resin composition is suppressed in occurrence of an appearance failure, such as a silver streak or a black streak, at the time of its molding despite containing the PC-POS copolymer and the white pigment. The molded article can be suitably used in parts for electrical and electronic equipment or casings for the equipment, parts for the interior and exterior of lighting equipment, parts for the interior and exterior of a vehicle, food trays, and eating utensils. In particular, the molded article is suitable as a material for a casing for a cellular phone, a mobile personal computer, a digital camera, a video camera, an electric tool, or the like.

The invention claimed is:

1. A polycarbonate-based resin composition, comprising a polycarbonate-based resin (A) containing a polycarbonate-polyorganosiloxane copolymer (A1) containing a polycarbonate block comprising a repeating unit represented by general formula (I) and a polyorganosiloxane block containing a repeating unit represented by general formula (II), 0.1 part by mass or more to 5 parts by mass or less of a white pigment (B) with respect to 100 parts by mass of the polycarbonate-based resin (A), and more than 0.2 parts by mass to 1 part by mass or less of a hydrolysis resistant agent (C) with respect to 100 parts by mass of the polycarbonate-based resin (A), wherein the hydrolysis resistant agent (C) is an epoxidized linseed oil, an average chain length n of the polyorganosiloxane block in the polycarbonate-polyorganosiloxane copolymer (A1) is 50 or more and the white pigment (B) has an organic layer on a surface thereof, and a highest peak temperature of an evolved gas analysis curve of the organic layer obtained by evolved gas analysis with a pyrolysis gas chromatograph apparatus and a FID detector is 390° C. or more:

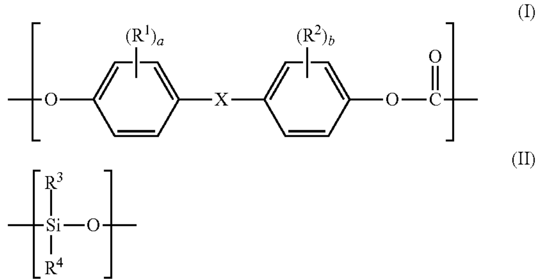

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —$SO_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and a and b each independently represent an integer of from 0 to 4.

2. The polycarbonate-based resin composition according to claim 1, wherein the average chain length n of the polyorganosiloxane block in the polycarbonate-polyorganosiloxane copolymer (A1) is 70 or more.

3. The resin composition according to claim 1, wherein a content of a polyorganosiloxane in the polycarbonate-based resin (A) is 0.1 mass % or more to 25 mass % or less.

4. The resin composition according to claim 1, wherein the polycarbonate-based resin (A) has a viscosity-average molecular weight of 12,000 or more to 50,000 or less.

5. The resin composition according to claim 1, wherein a content of the polyorganosiloxane block in the polycarbonate-polyorganosiloxane copolymer (A1) is 1.0 mass % or more to 25 mass % or less.

6. The resin composition according to claim 1, wherein the white pigment (B) comprises at least one selected from the group consisting of a titanium oxide pigment, a zinc sulfide pigment, a zinc oxide pigment, and a barium sulfate pigment.

7. The resin composition according to claim 6, wherein the white pigment (B) comprises the titanium oxide pigment.

8. The resin composition according to claim 7, wherein the titanium oxide pigment comprises titanium oxide particles having on its surface an inorganic oxide layer comprising one or more inorganic oxides selected from the group consisting of silica, zirconia, and alumina, and has an organic layer on a surface of the inorganic oxide layer.

9. The polycarbonate-based resin composition according to claim 1, wherein the organic layer is formed by a silane-based compound.

10. The polycarbonate-based resin composition according to claim 9, wherein the silane-based compound is a silane coupling agent.

11. The resin composition according to claim 1, wherein a value obtained by subtracting a moisture concentration of the white pigment (B) measured at from 0° C. to 120° C. by a Karl-Fischer method from a moisture concentration thereof measured at from 0° C. to 300° C. by the Karl-Fischer method is 8,000 ppm by mass or less.

12. The polycarbonate-based resin composition according to claim 1, wherein the content of the hydrolysis resistant agent (C) is 0.4 part by mass or more to 1.0 part by mass or less with respect to 100 parts by mass of the polycarbonate-based resin (A).

13. The polycarbonate-based resin composition according to claim 1, wherein the content of the hydrolysis resistant agent (C) is more than 0.2 part by mass to 0.5 part by mass or less with respect to 100 parts by mass of the polycarbonate-based resin (A).

14. The polycarbonate-based resin composition according to claim 1, wherein the content of the hydrolysis resistant agent (C) is 0.4 part by mass or more to 0.5 part by mass or less with respect to 100 parts by mass of the polycarbonate-based resin (A).

15. The polycarbonate-based resin composition according to claim 1, wherein the polycarbonate-based resin composition does not contain a metal deactivator.

16. A molded article, comprising the resin composition of claim 1.

* * * * *